US010277439B2

United States Patent
Sun et al.

(10) Patent No.: US 10,277,439 B2
(45) Date of Patent: Apr. 30, 2019

(54) DUAL STAGE CHANNEL INTERLEAVING FOR DATA TRANSMISSION

(71) Applicant: QUALCOMM Incorporated, San Diego, CA (US)

(72) Inventors: Jing Sun, San Diego, CA (US); Wanshi Chen, San Diego, CA (US); Durga Prasad Malladi, San Diego, CA (US); Seyedkianoush Hosseini, San Diego, CA (US); Juan Montojo, San Diego, CA (US); Peter Gaal, San Diego, CA (US); Taesang Yoo, Riverside, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/485,800

(22) Filed: Apr. 12, 2017

(65) Prior Publication Data

US 2018/0019900 A1 Jan. 18, 2018

Related U.S. Application Data

(60) Provisional application No. 62/363,559, filed on Jul. 18, 2016.

(51) Int. Cl.
*H04L 27/00* (2006.01)
*H04L 1/00* (2006.01)
(Continued)

(52) U.S. Cl.
CPC ........ *H04L 27/0012* (2013.01); *H04L 1/0057* (2013.01); *H04L 1/0059* (2013.01);
(Continued)

(58) Field of Classification Search
None
See application file for complete search history.

(56) References Cited

U.S. PATENT DOCUMENTS

| 8,271,848 B2* | 9/2012 | Bresalier ........... H03M 13/2957 714/755 |
| 2015/0295745 A1* | 10/2015 | Prodan ................ H04L 27/2637 375/260 |

(Continued)

FOREIGN PATENT DOCUMENTS

| CA | 2949371 A1 | 11/2015 |
| GB | 2532233 A | 5/2016 |
| WO | WO-2016093537 A1 | 6/2016 |

OTHER PUBLICATIONS

ATSC, "ATSC Candidate Standard: Physical Layer Protocol (A/322)", Physical Layer Protocol, Apr. 6, 2016, 258 pgs., ATSC S32-230r45, Advanced Television Systems Committee, Washington, D.C. USA.

(Continued)

*Primary Examiner* — Eunsook Choi
(74) *Attorney, Agent, or Firm* — Holland & Hart LLP

(57) ABSTRACT

Methods, systems, and devices for wireless communication are described that may perform dual stage channel interleaving in which code blocks are interleaved at the code block level and at a symbol level. The interleaved code block data may provide time diversity for the code block data, and the interleaved symbol data may provide frequency diversity for the code block data, thus helping to mitigate narrowband and/or bursty interference. The interleaving within the code block and interleaving within the symbols, in some examples, may allow pipelined implementation of decoding of the code blocks at the receiver, for faster processing. In some cases, systematic data and parity data may be inter- (Continued)

leaved within the code block data to provide a uniform distribution of the systematic data in time within the code block.

30 Claims, 22 Drawing Sheets

(51) Int. Cl.
    *H04L 12/931*     (2013.01)
    *H04W 24/02*     (2009.01)
    *H04L 27/26*     (2006.01)
    *H04L 12/935*     (2013.01)

(52) U.S. Cl.
    CPC .......... *H04L 1/0071* (2013.01); *H04L 49/201* (2013.01); *H04W 24/02* (2013.01); *H04L 27/2601* (2013.01); *H04L 49/3063* (2013.01)

(56) References Cited

U.S. PATENT DOCUMENTS

| | | | |
|---|---|---|---|
| 2016/0278117 A1* | 9/2016 | Sahlin | H04B 7/2615 |
| 2016/0345033 A1 | 11/2016 | Kwak et al. | |
| 2017/0142593 A1* | 5/2017 | Seo | H04W 16/14 |
| 2018/0227947 A1* | 8/2018 | Sahlin | H04B 7/2615 |

OTHER PUBLICATIONS

ISA/EP, International Search Report and Written Opinion of the International Searching Authority, Int'l Application No. PCT/US2017/037960, dated Oct. 2, 2017, European Patent Office, Rijswijk, NL, 16 pgs.

\* cited by examiner

DUAL STAGE CHANNEL INTERLEAVING FOR DATA TRANSMISSION

CROSS REFERENCES

The present Application for Patent claims priority to U.S. Provisional Patent Application No. 62/363,559 by Sun, et al., entitled "Dual Stage Channel Interleaving For Data Transmission," filed Jul. 18, 2016, assigned to the assignee hereof.

BACKGROUND

The following relates generally to wireless communication, and more specifically to dual stage channel interleaving for data transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

As data rates increase, faster processing if transmitted signals is beneficial in order to maintain relatively high data rates and relatively low latency. Additionally, as wireless communications networks become more congested, operators are seeking ways to increase capacity, such as via using small cells, unlicensed spectrum, or wireless local area networks (WLANs) to offload some of the traffic and/or signaling. Many of the approaches for enhancing capacity may cause interference with concurrent communications in a cell, or in adjacent/neighboring cells. Such interference may be narrowband interference or "bursty" interference having a short time duration. In order to provide enhanced data rates through a wireless communications network, it may be beneficial to enable faster processing of transmissions and mitigate various types of interference at a UE or base station.

SUMMARY

The described techniques relate to improved methods, systems, and devices that support dual stage channel interleaving for data transmission. For example, the described techniques provide for dual stage channel interleaving, in which code blocks are interleaved at the code block level, concatenated with other interleaved code blocks, allocated into orthogonal frequency division multiplexing (OFDM) symbols, interleaved again at the coded bit level, the modulation symbol level, or resource element level within each OFDM symbol, and transmitted to a receiver. The interleaving within the code block and interleaving within the OFDM symbols, in some examples, allows pipelined implementation of decoding of the code blocks at the receiver, for faster processing. In some cases, systematic data and parity data may be interleaved within the code block data to provide a uniform distribution of the systematic data in time within the code block. The interleaved code block data may provide time diversity for the code block data and the interleaved OFDM symbol data may provide frequency diversity for the code block data, thus helping to mitigate narrowband and/or bursty interference.

A method of wireless communication is described. The method may include identifying code block data to be transmitted in a code block to a receiver, interleaving the code block data to generate interleaved code block data, concatenating interleaved code block data from different code blocks sequentially, allocating the concatenated interleaved code block data into OFDM symbols sequentially, interleaving the concatenated interleaved code block data allocated into each OFDM symbol to generate interleaved OFDM symbol data to be transmitted in each OFDM symbol, and transmitting the OFDM symbols to the receiver.

An apparatus for wireless communication is described. The apparatus may include means for identifying code block data to be transmitted in a code block to a receiver, means for interleaving the code block data to generate interleaved code block data, means for concatenating interleaved code block data from different code blocks sequentially, means for allocating the concatenated interleaved code block data into OFDM symbols sequentially, means for interleaving the concatenated interleaved code block data allocated into each OFDM symbol to generate interleaved OFDM symbol data to be transmitted in each OFDM symbol, and means for transmitting the OFDM symbols to the receiver.

Another apparatus for wireless communication is described. The apparatus may include a processor, memory in electronic communication with the processor, and instructions stored in the memory. The instructions may be operable to cause the processor to identify code block data to be transmitted in a code block to a receiver, interleave the code block data to generate interleaved code block data, concatenate interleaved code block data from different code blocks sequentially, allocate the concatenated interleaved code block data into OFDM symbols sequentially, interleave the concatenated interleaved code block data allocated into each OFDM symbol to generate interleaved OFDM symbol data to be transmitted in each OFDM symbol, and transmit the OFDM symbols to the receiver.

A non-transitory computer readable medium for wireless communication is described. The non-transitory computer-readable medium may include instructions operable to cause a processor to identify code block data to be transmitted in a code block to a receiver, interleave the code block data to generate interleaved code block data, concatenate interleaved code block data from different code blocks sequentially, allocate the concatenated interleaved code block data into OFDM symbols sequentially, interleave the concatenated interleaved code block data allocated into each OFDM symbol to generate interleaved OFDM symbol data to be transmitted in each OFDM symbol, and transmit the OFDM symbols to the receiver.

Some examples of the method, apparatus, and non-transitory computer-readable medium described above may further include processes, features, means, or instructions for interleaving systematic data and parity data within the code block data to provide a uniform distribution of the systematic data in time within the code block. In some examples of the method, apparatus, and non-transitory computer-readable medium described above, the interleaved code block data provides time diversity for the code block data and the interleaved OFDM symbol data provides frequency diversity for the code block data. In some examples of the method, apparatus, and non-transitory computer-readable medium described above, the code block data comprises turbo code encoded data, low density parity check (LDPC) encoded data, or tail-biting convolutional code (TBCC) encoded data.

Some examples of the method, apparatus, and non-transitory computer-readable medium described above may further include processes, features, means, or instructions for allocating interleaved code block data from multiple code blocks into a plurality of other OFDM symbols; interleaving, for the plurality of other OFDM symbols, the associated portion of the interleaved code block data to generate interleaved OFDM symbol data for the plurality of other OFDM symbols; and transmitting the plurality of other OFDM symbols of the code block to the receiver. In some examples of the method, apparatus, and non-transitory computer-readable medium described above, interleaving within the code block and interleaving within the OFDM symbols may allow pipelined implementation of decoding of the code blocks at the receiver.

In some examples of the method, apparatus, and non-transitory computer-readable medium described above, the allocating may include identifying a resource allocation of wireless resources for transmission of the code blocks, the resource allocation including an allocation of the plurality of OFDM symbols, a plurality of resource elements (REs) within each OFDM symbol, and a set of spatial layers within each RE; firstly mapping the interleaved code block data to one or more spatial layers within a same RE; secondly mapping the interleaved code block data to a plurality of REs within an OFDM symbol; and thirdly mapping the interleaved code blocks data to the plurality of OFDM symbols.

Some examples of the method, apparatus, and non-transitory computer-readable medium described above may further include processes, features, means, or instructions for receiving, from the receiver, an indication of whether the receiver may be capable of supporting two stage channel interleaving. Some examples of the method, apparatus, and non-transitory computer-readable medium described above may further include processes, features, means, or instructions for performing two stage interleaving to generate the interleaved code block data and the interleaved OFDM symbol data responsive to the receiver indicating that it may be capable of supporting two stage interleaving. Some examples of the method, apparatus, and non-transitory computer-readable medium described above may further include processes, features, means, or instructions for performing a legacy no channel interleaving or single stage channel interleaving in an absence of receiving an indication that the receiver may be capable of supporting two stage channel interleaving.

Some examples of the method, apparatus, and non-transitory computer-readable medium described above may further include processes, features, means, or instructions for determining whether the code block data includes broadcast data to be transmitted to a plurality of receivers or unicast data to be transmitted to a single receiver, performing two stage channel interleaving to generate the interleaved code block data and the interleaved OFDM symbol data when the code block data includes unicast data, and bypassing the interleaving to generate the interleaved code block data and the interleaved OFDM symbol data when the code block data includes broadcast data.

A method of wireless communication is described. The method may include receiving a plurality of OFDM symbols of a transmitted code block, demodulating the plurality of OFDM symbols to obtain interleaved OFDM symbol data for the plurality of OFDM symbols, deinterleaving the interleaved OFDM symbol data for the plurality of OFDM symbols to obtain deinterleaved OFDM symbol data for the plurality of OFDM symbols, concatenating the deinterleaved OFDM symbol data for the plurality of OFDM symbols of the transmitted code block to obtain interleaved code block data of the transmitted code block, deinterleaving the interleaved code block data to obtain deinterleaved code block data, and decoding the deinterleaved code block data.

An apparatus for wireless communication is described. The apparatus may include means for receiving a plurality of OFDM symbols of a transmitted code block, means for demodulating the plurality of OFDM symbols to obtain interleaved OFDM symbol data for the plurality of OFDM symbols, means for deinterleaving the interleaved OFDM symbol data for the plurality of OFDM symbols to obtain deinterleaved OFDM symbol data for the plurality of OFDM symbols, means for concatenating the deinterleaved OFDM symbol data for the plurality of OFDM symbols of the transmitted code block to obtain interleaved code block data of the transmitted code block, means for deinterleaving the interleaved code block data to obtain deinterleaved code block data, and means for decoding the deinterleaved code block data.

Another apparatus for wireless communication is described. The apparatus may include a processor, memory in electronic communication with the processor, and instructions stored in the memory. The instructions may be operable to cause the processor to receive a plurality of OFDM symbols of a transmitted code block, demodulate the plurality of OFDM symbols to obtain interleaved OFDM symbol data for the plurality of OFDM symbols, deinterleave the interleaved OFDM symbol data for the plurality of OFDM symbols to obtain deinterleaved OFDM symbol data for the plurality of OFDM symbols, concatenate the deinterleaved OFDM symbol data for the plurality of OFDM symbols of the transmitted code block to obtain interleaved code block data of the transmitted code block, deinterleave the interleaved code block data to obtain deinterleaved code block data, and decode the deinterleaved code block data.

A non-transitory computer readable medium for wireless communication is described. The non-transitory computer-readable medium may include instructions operable to cause a processor to receive a plurality of OFDM symbols of a transmitted code block, demodulate the plurality of OFDM symbols to obtain interleaved OFDM symbol data for the plurality of OFDM symbols, deinterleave the interleaved OFDM symbol data for the plurality of OFDM symbols to obtain deinterleaved OFDM symbol data for the plurality of OFDM symbols, concatenate the deinterleaved OFDM symbol data for the plurality of OFDM symbols of the transmitted code block to obtain interleaved code block data of the transmitted code block, deinterleave the interleaved code block data to obtain deinterleaved code block data, and decode the deinterleaved code block data.

In some examples of the method, apparatus, and non-transitory computer-readable medium described above, the interleaved code block data comprises interleaved systematic data and parity data within the code block, and the systematic data may be uniformly distributed throughout the interleaved code block data. In some examples of the method, apparatus, and non-transitory computer-readable medium described above, the interleaved code block data provides time diversity for the deinterleaved code block data and the interleaved OFDM symbol data provides frequency diversity for the deinterleaved code block data. In some examples of the method, apparatus, and non-transitory computer-readable medium described above, the decoding the deinterleaved code block data comprises decoding of turbo code encoded data, LDPC encoded data, or TBCC encoded data. In some examples of the method, apparatus, and non-transitory computer-readable medium described above, the decoding the deinterleaved code block data comprises pipelined decoding of the code block.

Some examples of the method, apparatus, and non-transitory computer-readable medium described above may further include processes, features, means, or instructions for transmitting an indication to a transmitter of the transmitted code block that indicates capability for supporting the two stage channel interleaving.

Some examples of the method, apparatus, and non-transitory computer-readable medium described above may further include processes, features, means, or instructions for receiving signaling indicating whether the transmitted code block contains interleaved code block data and interleaved OFDM symbol data; performing a legacy single stage deinterleaving of parity data within the transmitted code block when the signaling does not indicate that the transmitted code block contains interleaved OFDM symbol data; and performing the deinterleaving the interleaved OFDM symbol data, concatenating, and deinterleaving the interleaved code block data when the signaling does indicate that the transmitted code block contains interleaved OFDM symbol data.

A method of wireless communication is described. The method may include identifying code block data to be transmitted in a code block to a receiver, allocating the code block data into a plurality of OFDM symbols, interleaving the code block data allocated into the OFDM symbols to generate interleaved OFDM symbol data for the OFDM symbols, and transmitting the OFDM symbols to the receiver.

An apparatus for wireless communication is described. The apparatus may include means for identifying code block data to be transmitted in a code block to a receiver, means for allocating the code block data into a plurality of OFDM symbols, means for interleaving the code block data allocated into the OFDM symbols to generate interleaved OFDM symbol data for the OFDM symbols, and means for transmitting the OFDM symbols to the receiver.

Another apparatus for wireless communication is described. The apparatus may include a processor, memory in electronic communication with the processor, and instructions stored in the memory. The instructions may be operable to cause the processor to identify code block data to be transmitted in a code block to a receiver, allocate the code block data into a plurality of OFDM symbols, interleave the code block data allocated into the OFDM symbols to generate interleaved OFDM symbol data for the OFDM symbols, and transmit the OFDM symbols to the receiver.

A non-transitory computer readable medium for wireless communication is described. The non-transitory computer-readable medium may include instructions operable to cause a processor to identify code block data to be transmitted in a code block to a receiver, allocate the code block data into a plurality of OFDM symbols, interleave the code block data allocated into the OFDM symbols to generate interleaved OFDM symbol data for the OFDM symbols, and transmit the OFDM symbols to the receiver.

Some examples of the method, apparatus, and non-transitory computer-readable medium described above may further include processes, features, means, or instructions for interleaving the code block data to generate interleaved code block data, and wherein the allocating the code block data comprises allocating the interleaved code block data into the OFDM symbols.

Some examples of the method, apparatus, and non-transitory computer-readable medium described above may further include processes, features, means, or instructions for interleaving systematic data and parity data within the code block data to provide a uniform distribution of the systematic data in time within the code block. In some examples of the method, apparatus, and non-transitory computer-readable medium described above, the interleaved OFDM symbol data provides frequency diversity for the code block data. In some examples of the method, apparatus, and non-transitory computer-readable medium described above, the interleaved OFDM symbol data allows for pipelined decoding of the code block at the receiver.

Further scope of the applicability of the described methods and apparatuses will become apparent from the following detailed description, claims, and drawings. The detailed description and specific examples are given by way of illustration, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Additionally or alternatively, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
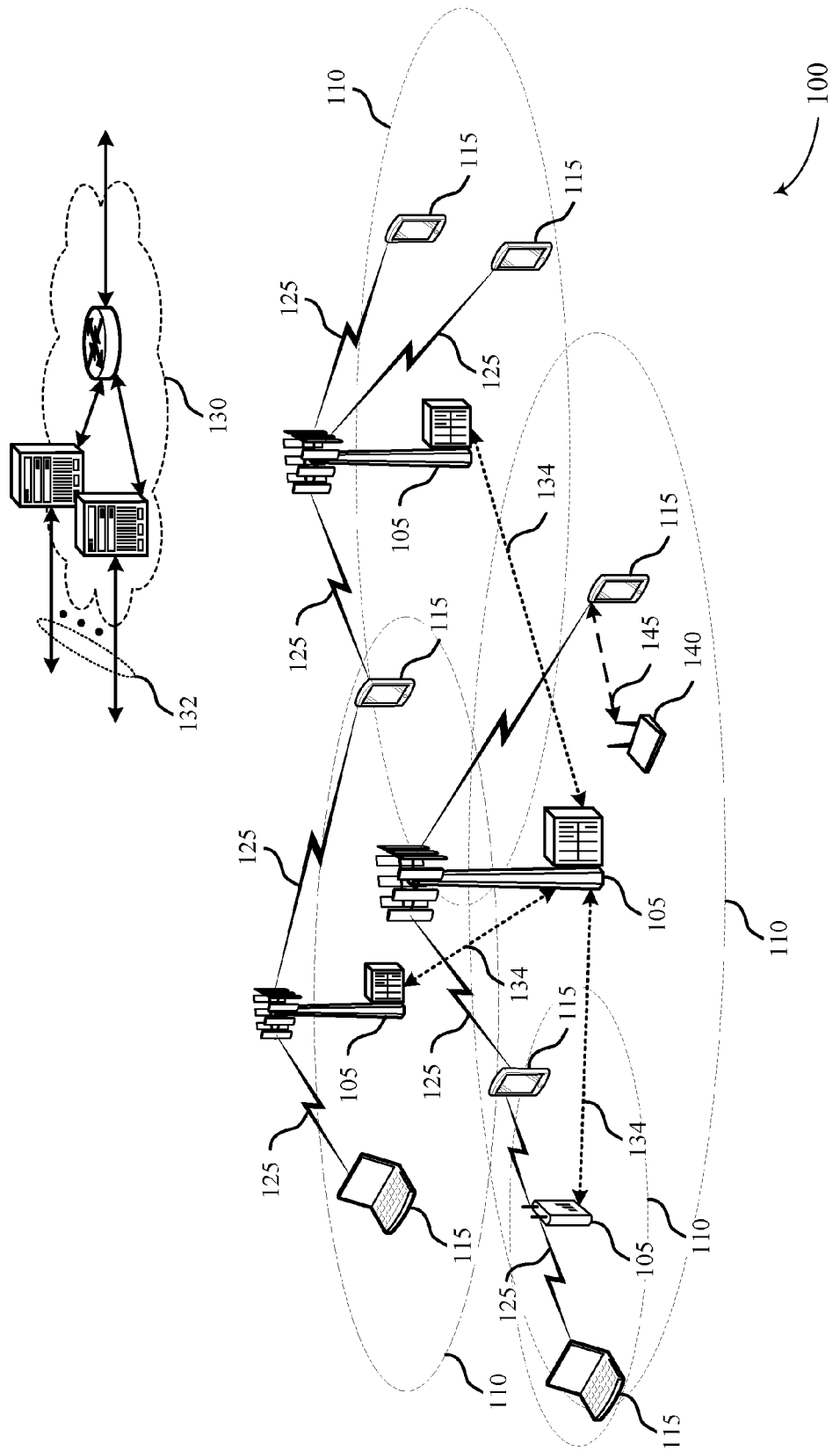
FIG. 1 illustrates an example of a system for wireless communication that supports dual stage channel interleaving for data transmission in accordance with various aspects of the present disclosure.

A UE or a base station operating in a wireless communications system may perform dual stage channel interleaving in which coded bits are interleaved at the code block level and at an OFDM symbol level. The code block level interleaving may provide time diversity for the code block data and the OFDM symbol level interleaving may provide frequency diversity for the code block data, thus helping to mitigate narrowband and/or bursty interference. The interleaving within the code block and interleaving within the OFDM symbols, in some examples, may allow pipelined implementation of decoding of the code blocks at the receiver, for faster processing. In some cases, systematic data and parity data may be interleaved within the code block data to provide a uniform distribution of the systematic data in time within the code block, further enhancing interference mitigation relative to systematic bits that are not interleaved within a code block.

By way of example, in many traditional or legacy LTE systems, transmissions are made within transmission tine intervals (TTIs). Within each TTI, a data stream may be transmitted between a base station and a UE in a physical downlink shared channel (PDSCH) for downlink communications or a physical uplink shared channel (PUSCH) for uplink communications. The data stream transmitted in the PDSCH or PUSCH may be segmented in units of code blocks. Each code block, in some deployments, is turbo code or LDPC code encoded, to generate systematic bits and parity bits for the code block. In many legacy systems, the parity bits may be interleaved within the code block, the systematic bits and interleaved parity bits may be put in a circular buffer, and a rate matching function will pick certain number of bits from circular buffer of each code block for one transmission. For a particular redundancy version identification (RVID), the starting point within the circular buffer is identified and a certain number of bits are retrieved from the circular buffer. The output from each circular buffer is sequentially concatenated and sent to a modulator. The modulated symbol is either filled frequency first, for PDSCH transmission, or time first, for PUSCH transmissions.

As indicated above, as data rates increase and operators employ various techniques to increase system capacity, additional techniques for enhancing decoding of transmissions and for mitigating some types of interference may be desirable. For example, various timing parameters for providing feedback of successful reception of a code block may require relatively fast processing of a received code block, and pipelined decoding of code blocks may be desirable. In some legacy systems, PUSCH transmissions may be configured such that wireless resources of a tone are filled for multiple OFDM symbols, and then the next tone is filled for the multiple OFDM symbols. Such techniques may not allow for pipelined decoding of OFDM symbols, as the multiple OFDM symbols are needed in order to process a code block.

Additionally, some types of transmissions used for increasing system capacity may have a higher likelihood of narrowband or bursty interference. For example, if a carrier uses a shared radio frequency spectrum band, other transmitters using the shared radio frequency spectrum band may transmit narrowband or short duration transmissions that may interfere with a transmission between a UE and a base station. Additionally, in some cases systems may use shorter TTIs for some transmissions, which may be more susceptible to bursty interference relative to systems that may use longer TTIs. For example, if an operator wants to employ wideband communications, such as through using a channel having an 80 MHz bandwidth rather than four 20 MHz channels, using 8×8 multiple-input-multiple-output (MIMO) on eight receive antennas and eight transmit antennas, and employing 256 quadrature amplitude modulation (256 QAM), each OFDM symbol may be capable of transmitting multiple code blocks (e.g., up to 20 code blocks per OFDM symbol). Thus, within an OFDM symbol without interleaving, a code block may be contained within a fraction of the 80 MHz channel (e.g., within the first $\frac{1}{20}$th of the bandwidth if there are 20 code blocks per OFDM symbol). Narrowband interference occupying all of a portion of the fraction of the bandwidth containing the code block may thus cause a failure to receive the entire code block.

Various of the techniques described herein, as indicated above, provide for dual stage channel interleaving in which code blocks are interleaved at the code block level, concatenated with other interleaved code blocks, allocated into OFDM symbols, interleaved again at the modulation symbol level within each OFDM symbol, and transmitted to a receiver. The interleaving within the code block and interleaving within the OFDM symbols may allow pipelined implementation of decoding of the code blocks at the receiver. Additionally, systematic data and parity data may be interleaved within the code block data to provide a uniform distribution of the systematic data in time within the code block. The interleaved code block data may provide time diversity for the code block data and the interleaved OFDM symbol data may provide frequency diversity for the code block data, thus helping to mitigate narrowband interference, bursty interference, or combinations thereof. In cases where modulation symbols from a code block naturally occupy multiple OFDM symbols (e.g., when the code block size is relatively long, the number of resource blocks (RBs) assigned is small, and the coding rate is relatively low), the systematic bits of the code block may be distributed uniformly across all OFDM symbols, thus providing additional time diversity.

Such dual stage interleaving techniques may thus achieve higher diversity in multiple cases. For example, in the case of a wideband assignment with narrowband interference, as a code block is distributed in the whole wideband assignment using the second stage interleaving (e.g., per OFDM symbol interleaving), the additional frequency diversity may mitigate the narrowband interference. Additionally or alternatively, in the case of a narrowband assignment with short time domain interference, as the systematic bits in a code block may be distributed in all OFDM symbols occupied by the code block through the first stage interleaving (e.g., code block-level interleaving), the additional time diversity may mitigate the short time domain interference.

In some examples, one or more UEs or base stations may use either dual stage channel interleaving or legacy channel interleaving for some transmissions. In such cases, a UE may indicate the capability for the dual stage channel interleaving support. When such a capability is indicated by the UE, the base station may determine whether to enable dual stage interleaving for unicast traffic, and may indicate the interleaving to use via dynamic or semi-static signaling. In some examples, broadcast traffic may follow legacy channel interleaving and mapping for backward compatibility. Such dual stage channel interleaving capability indications and scheduling may allow for an operator to configure certain traffic and certain UEs based on the capability of one or more UEs being served.

Aspects of the disclosure are initially described in the context of a wireless communications system. Subsequent figures depict examples of interleaving techniques that support dual stage channel interleaving. Aspects of the disclosure are further illustrated by and described with reference to apparatus diagrams, system diagrams, and flowcharts that relate to dual stage channel interleaving for data transmission.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. One or more of the UEs 115 may have a capability for dual stage channel interleaving, and one or more of the base stations 105 may account for such capabilities when scheduling communications and transmitting to provide for pipelined deciding and interference mitigation.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ listen before talk (LBT) procedures to ensure the channel is clear before transmitting data. In some cases, operations in unlicensed bands may be based on a carrier aggregation configuration in conjunction with component carriers (CCs) operating in a licensed band. Operations in unlicensed spectrum may include downlink transmissions, uplink transmissions, or both. Duplexing in unlicensed spectrum may be based on frequency division duplex (FDD), time division duplex (TDD), or a combination of both.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may additionally or alternatively be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable.

As indicated above, in examples where shared radio frequency spectrum may be used for all or a portion of communications, when eCC is utilized, or combinations thereof, interference may occur that is narrowband interference, or short time duration or bursty interference may occur. In the example of FIG. 1, a Wi-Fi AP 140 may communicate with a Wi-Fi receiver (not shown), and may generate an interfering signal 145 (e.g., narrowband and/or bursty interference) with one or more UEs 115 or base stations 105. Various aspects of the present disclosure provide techniques for enhanced mitigation of such interference, while also providing enhanced capability for pipelined decoding operations for some transmissions.

Figure 2:
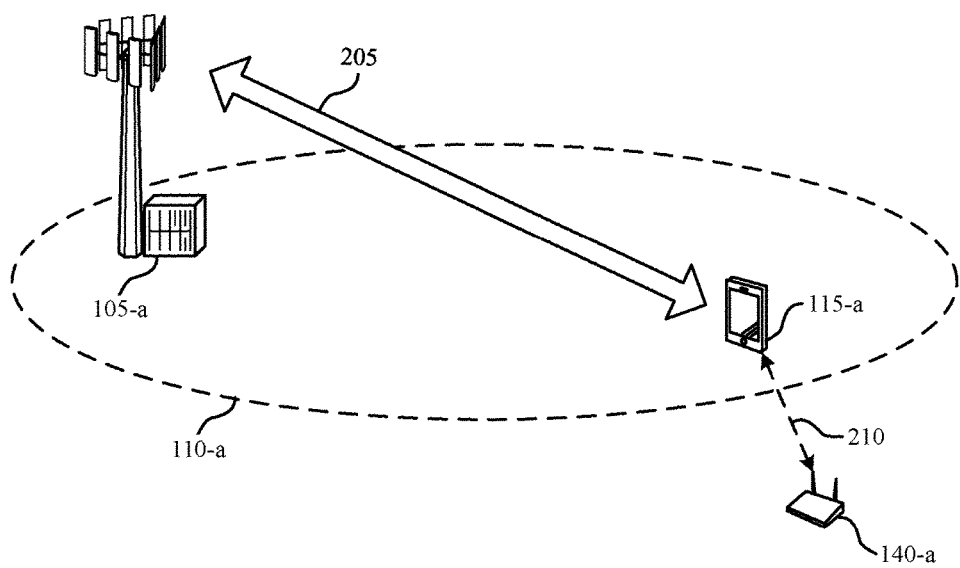
FIG. 2 illustrates an example of a system for wireless communication that supports dual stage channel interleaving for data transmission in accordance with various aspects of the present disclosure.

FIG. 2 illustrates an example of a wireless communications system 200 for dual stage channel interleaving in wireless communications in accordance with various aspects of the present disclosure. UE 115-a may be an example of a UE 115 as described herein with reference to FIG. 1. UE 115-a may be configured for dual stage channel interleaving. Base station 105-a may be an example of base stations 105 as described herein with reference to FIG. 1. The base station 105-a may have an associated coverage area 110-a, and may communicate with UE 115-a via communications link 205, which may be an example of communications link 125 of FIG. 1.

In the example, of FIG. 2, a Wi-Fi AP 140-a may be located outside of the coverage area 110-a, but may be capable of generating an interfering signal 210 that may cause interference at UE 115-a. For example, the base station 105-a may initiate a transmission using communications link 205, and Wi-Fi AP 140-a may transmit a relatively short and/or narrowband transmission (e.g., a ready to send (RTS) transmission). The Wi-Fi AP 140-a may be outside of an energy detection range of base station 105-a, and may not detect the transmission via communications link 205, for example, and thus transmit interfering signal 210. In various examples of the present disclosure, the communications link 205 may employ dual stage channel interleaving, in which coded bits are interleaved at a code block level and at an OFDM symbol level, thus providing frequency diversity for a code block transmitted using communications link 205 and potentially time diversity if the code block spans multiple OFDM symbols. Thus, such a transmission may have a higher likelihood of successful reception as the interfering signal 210 may cause interference with a portion of the transmission of communications link 205, and the deinterleaving combined with decoding according to the coding scheme used (e.g., turbo coding or LDPC coding) may allow for successful decoding of the transmission.

Furthermore, as indicated above, some examples may configure transmissions to provide for pipelined decoding of a transmission. In such examples, pipelined decoding may be enabled through mapping of data within the wireless resources of communications link. For example, a resource allocation may include an allocation of the plurality of OFDM symbols, a plurality of REs within each OFDM symbol, and a set of spatial layers within each RE. In some examples, transmitting device (e.g., base station 105-a or UE 115-a) may first map interleaved code block data to one or more spatial layers within a same RE. The transmitting device may then map the interleaved code block data to a plurality of REs within an OFDM symbol, and finally map the interleaved code blocks data to the plurality of OFDM symbols. The receiving device (e.g., base station 105-a or UE 115-a that is receiving the transmission) may decode received transmissions on an OFDM symbol basis and perform processing as consecutive symbols are received.

The UE 115-a, in some examples, may provide an indication to the base station 105-a of a capability for the UE 115-a to perform dual stage channel interleaving. Such signaling of an indication of the UE 115-a capability may allow the base station 105-a to configure either dual stage channel interleaving or legacy channel interleaving for some transmissions. When UE 115-a indicated capability for dual stage channel interleaving, the base station 150-a may determine whether to enable dual stage interleaving for unicast traffic, and may indicate the configured interleaving via dynamic or semi-static signaling. In some examples, broadcast traffic may follow legacy channel interleaving (or no interleaving) and mapping for backward compatibility.

Figure 3:
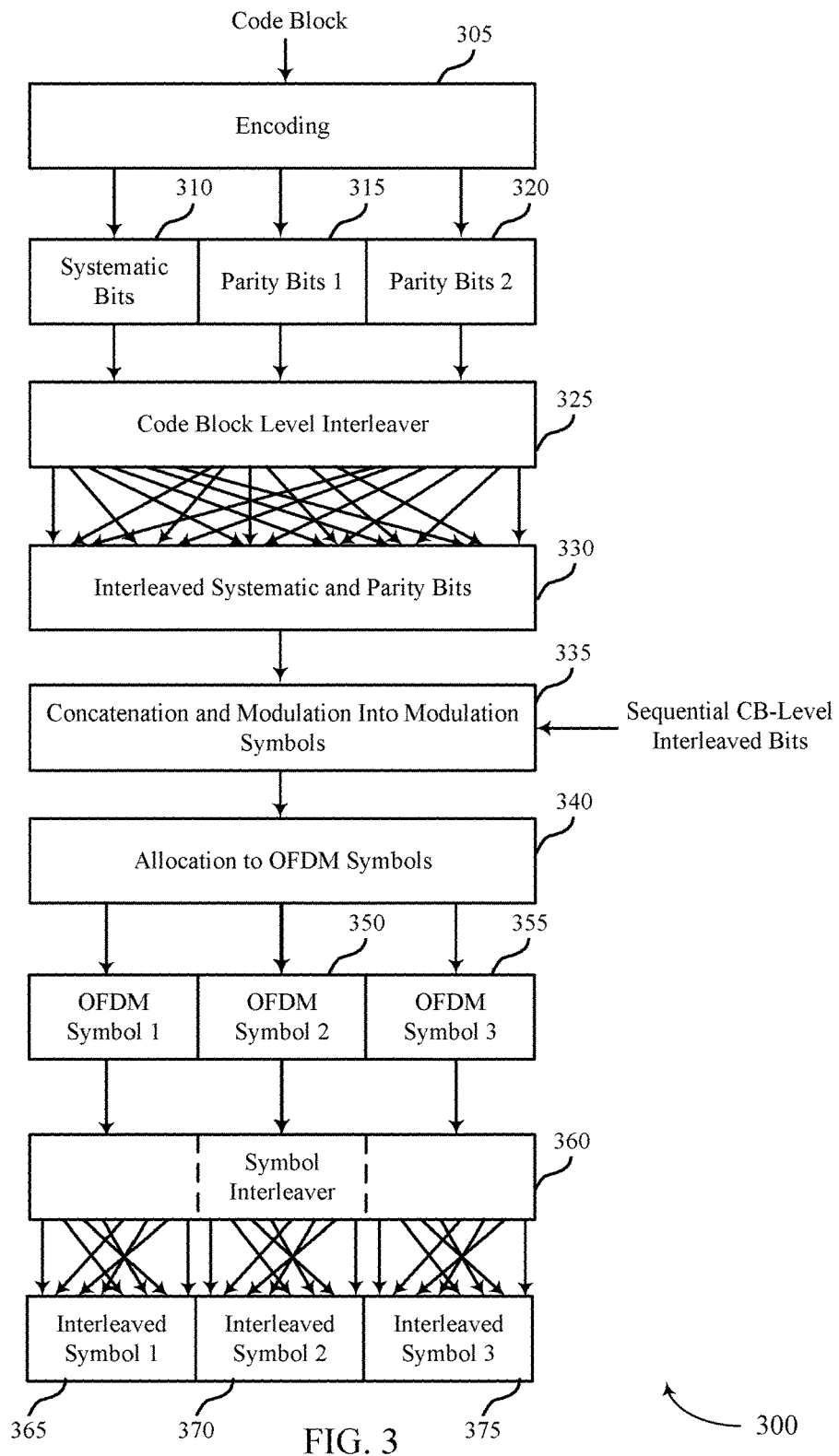
FIG. 3 illustrates an example of dual stage channel interleaving for data transmission in accordance with various aspects of the present disclosure.

FIG. 3 illustrates an example 300 of dual stage channel interleaving for data transmission in accordance with various aspects of the present disclosure. The dual stage interleaving of example 300 may be performed by a UE 115 or base station 105 and be used for communications between UEs 115 and base stations 105 as discussed in FIGS. 1-2.

A code block may be input into an encoding block 305. The code block may be provided according to established techniques, and may include uplink or downlink shared data to be transmitted using a PUSCH or PDSCH, for example. The encoding block 305, in this example, may output systematic bits 310, and a first set of parity bits 315 and a second set of parity bits 320. Code block level interleaver 325 may then perform code block level interleaving on the encoded code block bits. In some examples, systematic bits 310 from the encoding block may be interleaved with parity bits 315-320 to provide that the systematic bits 310 and parity bits 315-320 are distributed throughout interleaved code block to provide interleaved systematic and parity bits 330.

A concatenation and modulation block 335 may concatenate the interleaved systematic and parity bits 330 sequentially with consecutive code block level interleaved bits, and modulate the concatenated output into modulation symbols. Allocation of the modulation symbols to OFDM symbols may be performed at block 340, to generate first OFDM symbol 345, second OFDM symbol 350, and third OFDM symbol 355. The number of OFDM symbols is illustrated in FIG. 3 for the purposes of illustration and discussion, and the modulation symbols may be allocated to any number of OFDM symbols. The OFDM symbols 345-355 may then be provided to symbol interleaver 360, which may perform a second interleaving step at OFDM symbol level within each OFDM symbol, which may provide frequency diversity for data within each OFDM symbol to provide interleaved first OFDM symbol 365, interleaved second OFDM symbol 370, and interleaved third OFDM symbol 375. The interleaved OFDM symbols 365-375 may then be transmitted to a receiver Such dual stage channel interleaving may provide a unified design that achieves higher diversity in multiple cases. For example, in the case of a wideband channel transmission that experiences narrowband interference, the code block is distributed across the entire bandwidth of the wideband channel by the symbol interleaver 360, thus enhancing the likelihood that a sufficient portion of the code block is received for successful decoding of the code block. In the case of a narrowband transmission that experiences bursty or short time domain interference, the distribution of the systematic bits across the code block as provided by code block level interleaver 325 may enhance the likelihood that a sufficient portion of the code block is received for successful decoding of the code block.

Figure 4:
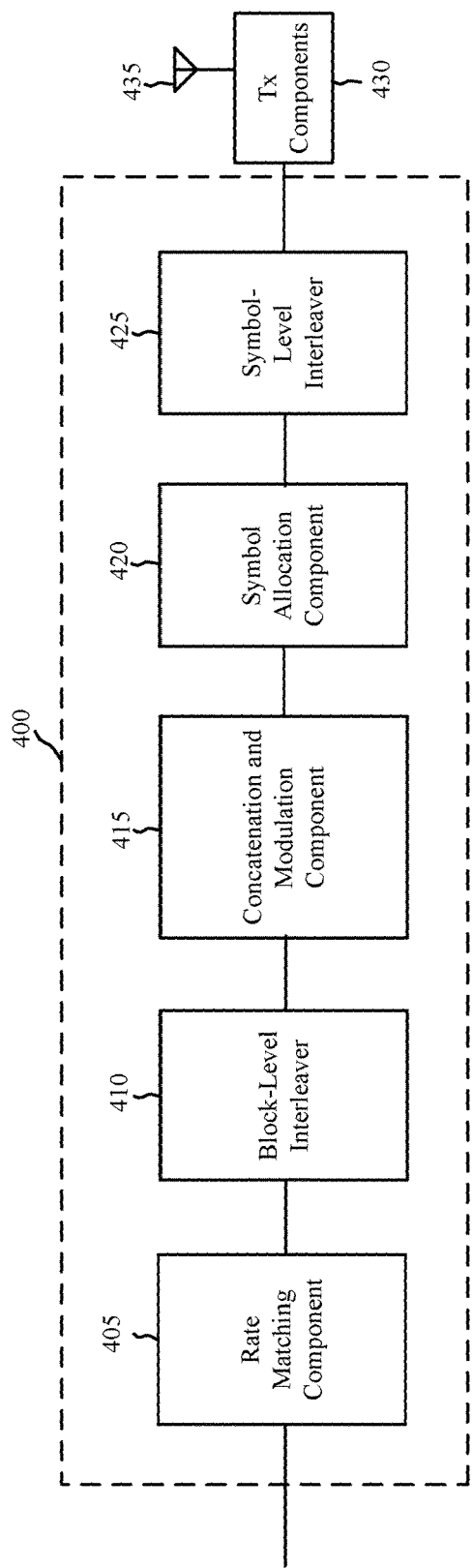
FIG. 4 illustrates an example of transmission processing components that support dual stage channel interleaving for data transmission in accordance with various aspects of the present disclosure.

FIG. 4 illustrates an example of transmission processing components 400 that support dual stage channel interleaving for data transmission in accordance with various aspects of the present disclosure. Processing components 400 may be included in a UE 115 or base station 105 and be used for communications between UEs 115 and base stations 105 as discussed in FIGS. 1-2.

In some examples, dual stage interleaving may be provided through processing components used for coding, modulating, and transmitting. For example, within the base station 105 or UE 115 that is transmitting a signal, a rate matching component 405 may identify which set of coded bits are to be transmitted for each code block, according to legacy rate matching techniques. Transmission processing components 400 may then perform a code block level interleaving at block-level interleaver 410. In some examples, a linear interleaver may be used to provide block-level interleaver 410, and may provide a uniform distribution of systematic bits throughout the interleaved code block, although other interleaving techniques may be used in some cases. In some examples, block-level interleaver 410 may perform block level interleaving on control channel transmissions and shared channel transmissions. In cases where block-level interleaving is performed on control channel transmissions, the control channel may use TBCC rather than turbo coding or LDPC coding. In the TBCC case, the code is not systematic, and the block-level interleaver 410 may provide interleaving that may break bursty errors (in either time domain or frequency domain) into random errors, which better fits the TBCC.

A concatenation and modulation component may concatenate the output of the block-level interleaver 410 sequentially and modulate the concatenated output into modulation symbols. Symbol allocation component 420 may allocate the modulation symbols into OFDM symbols. Then, symbol-level interleaver 425 may perform a second interleaving step at OFDM symbol level within each OFDM symbol, which may provide frequency diversity for data within each OFDM symbol. The interleaved OFDM symbols may be provided to transmit components 430 (e.g., inverse fast fourier transform (IFFT) components, analog to digital converter (ADC) components, radio frequency (RF) components) for transmission via one or more antennas 435. In some examples, a linear interleaver may be used to provide symbol-level interleaver 425, although other interleaving techniques may be used in some cases, and may provide enhanced frequency diversity for bits of a code block transmitted within an OFDM symbol.

Figure 5:
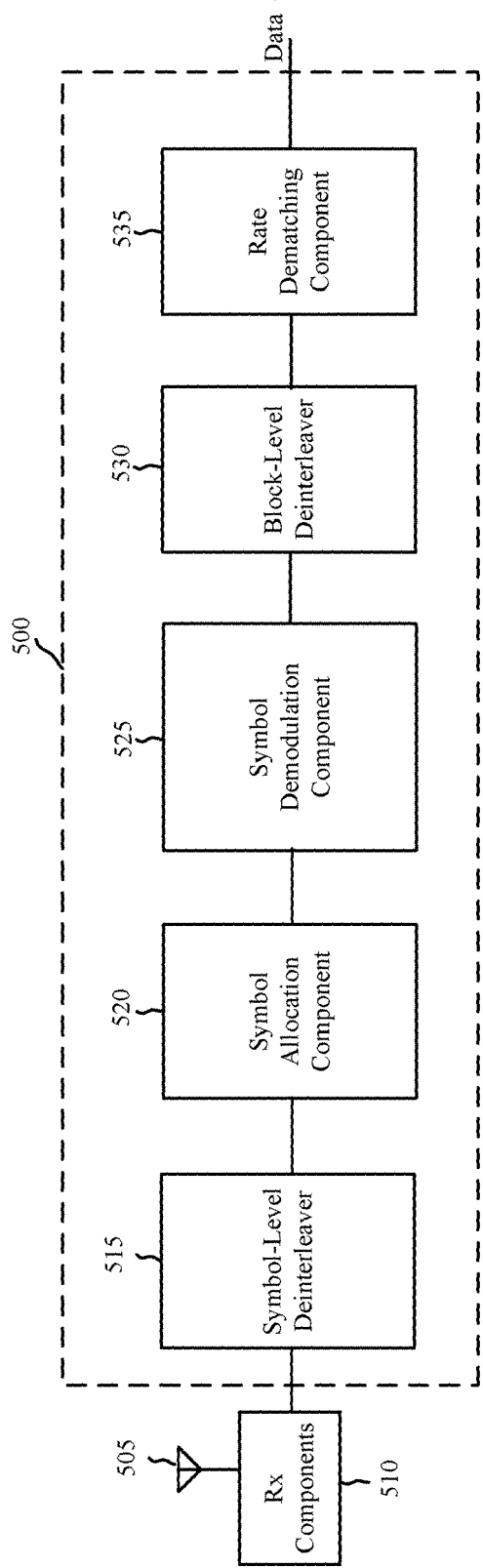
FIG. 5 illustrates an example of receive processing components that support dual stage channel interleaving for data transmission in accordance with various aspects of the present disclosure.

FIG. 5 illustrates an example of example of receive processing components 500 that support dual stage channel interleaving for data transmission in accordance with various aspects of the present disclosure. Processing components 500 may be included in a UE 115 or base station 105 and be used for communications between UEs 115 and base stations 105 as discussed in FIGS. 1-2.

In some examples, dual stage interleaving may be provided through processing components used for receiving, decoding, and demodulating transmissions. For example, within the base station 105 or UE 115 that is receiving a signal, a transmission may be received at one or more antennas 505. The transmission may include interleaved OFDM symbols, as discussed above, which may be processed using receive components 510 (e.g., fast fourier transform (FFT) components, ADC components, RF components).

The received signal may be provided to symbol-level deinterleaver 515, which may perform a symbol-level deinterleaving at a modulation symbol level within each OFDM symbol. In some examples, a linear deinterleaver may be used to provide symbol-level deinterleaver 515, although other deinterleaving techniques may be used based on the interleaving technique used at the transmitter.

The deinterleaved modulation symbols may be provided to symbol allocation component 520, which may determine the allocation of modulation symbols in the received OFDM symbols, and provide modulation symbols to symbol demodulation component 525.

The symbol demodulation component 525 may demodulate the modulation symbols and concatenate the demodulated symbols to provide an interleaved code block to a block-level deinterleaver 530. The block-level deinterleaver 530 perform a code block level deinterleaving, which may deinterleave systematic bits and parity bits of the code block. In some examples, a linear deinterleaver may be used to provide block-level deinterleaver 530, although other deinterleaving techniques may be used in some cases. In some examples, received transmissions may include control channel transmissions, and block-level deinterleaver 530 may perform block level deinterleaving on control channel transmissions and shared channel transmissions.

The deinterleaved code block may be provided to rate dematching component 535, which may identify which set of coded bits were transmitted for each code block, according to legacy rate matching techniques. Such dual stage channel deinterleaving may provide a unified design that achieves higher diversity in multiple cases, as discussed above.

Figure 6:
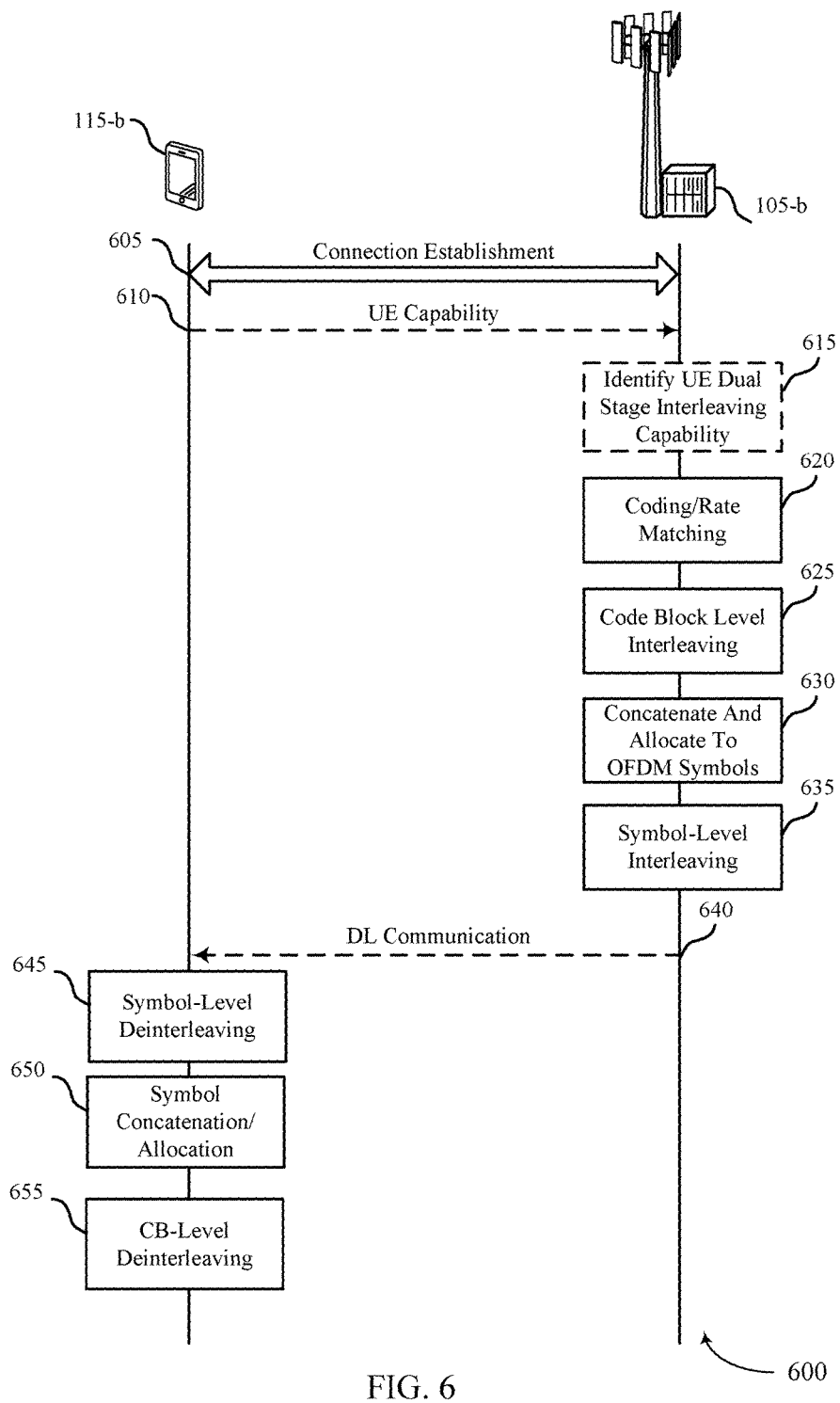
FIG. 6 illustrates an example of a process flow that supports dual stage channel interleaving for data transmission in accordance with various aspects of the present disclosure.

FIG. 6 illustrates an example of a process flow 600 for dual stage channel interleaving for data transmission in accordance with various aspects of the present disclosure. The steps of process flow 600 may be performed by UE 115-*b* and base station 105-*b*, which may be examples of a UE 115 and a base station 105 as described above.

The base station 105-*b* and UE 115-*b* may perform a connection establishment 605 to establish a radio resource control (RRC) connection. In some examples, various configurations of parameters may be performed as part of the connection establishment 605, such as enabling dual stage channel interleaving via dynamic or semi-static configuration changes, configuring various communications parameters (e.g., Hybrid Automatic Repeat Request (HARQ) parameters and HARQ timing), configuring physical uplink control channel (PUCCH) resource offsets, or configuring interleaving for unicast versus broadcast transmissions, for example. In some cases, the UE 115-*b* may signal UE capability 610 to base station 105-*b*, which may include an indication that the UE 115-*b* is capable of dual stage channel interleaving.

The base station 105-*b* may, at optional block 615, identify the dual stage interleaving capability for UE 115-*b*, such as according to the signaled UE capability 610, for example. In other examples, the base station 105-*b* may identify the capability of the UE 115-*b* through other techniques, such as by an indication of a UE-type of UE 115-*b*, an indication of one or more other capabilities that may additionally or alternatively indicate capability for dual stage channel interleaving, or an indication in an access request, to name but a few examples. In some examples, the base station 105-*b* may determine whether to use dual stage interleaving for a transmission by determining whether code block data to be transmitted includes broadcast data to be transmitted to a plurality of receivers or unicast data to be transmitted to a single receiver. Two stage channel interleaving may be performed to generate interleaved code block data and the interleaved OFDM symbol data when the code block data includes unicast data, and dual stage interleaving may be bypassed when the code block data includes broadcast data, in some examples.

At block 620, the base station may perform coding and rate matching for downlink data to be transmitted to UE 115-*b*. While the example of FIG. 6 illustrates a downlink transmission that uses dual stage channel interleaving, such techniques are additionally or alternatively applicable to uplink transmissions. The coding and rate matching for the downlink data to be transmitted to UE 115-*b* may be performed according to established legacy coding and rate matching (e.g., as described in 3GPP technical specification 36.212).

At block 625, the base station 105-*b* may perform code block level interleaving on the coded and rate matched code block data. The code block level interleaving may include interleaving systematic data and parity data within the code block data to provide a uniform distribution of the systematic data in time within the code block, for example. In some examples, a linear interleaver is used for code block level interleaving, to provide the uniform distribution of the systematic data in time within the code block. In other examples other types of interleaving may be used, such as convolutional interleaving, random interleaving, S-random interleaving (e.g., where the interleaver is a known random permutation with the constraint that no input symbols within distance S appear within a distance of S in the output), or contention-free quadratic permutation polynomial (QPP) interleaving, for example.

At block 630, the interleaved code block may be concatenated with other interleaved code blocks and allocated to one or more OFDM symbols. Such concatenation may be performed using a buffer, for example, and allocation to the OFDM symbols performed according to resource allocations associated with the OFDM symbols. In some examples, allocation may be made through identifying a resource allocation of wireless resources for transmission of the code blocks, the resource allocation including an allocation of the plurality of OFDM symbols, a plurality of REs within each OFDM symbol, and a set of spatial layers within each RE. Allocations may be performed, in some examples, by first mapping the interleaved code block data to one or more spatial layers within a same RE, then mapping the interleaved code block data to a plurality of REs within an OFDM symbol, and finally mapping the interleaved code blocks data to the plurality of OFDM symbols.

At block 635, the base station 105-*b* may perform symbol-level interleaving at the modulation symbol level within each OFDM symbol. The symbol-level interleaving may include interleaving to provide frequency diversity for data within the OFDM symbol. In some examples, a linear interleaver is used for symbol-level interleaving, to provide the uniform distribution of data throughout an allocated frequency bandwidth, although other types of interleaving may be used similarly as discussed above.

The base station 105-*b* may then transmit downlink communication 640 to the UE 115-*b*. The UE 115-*b* may receive the downlink communication 640 at one or more receive antennas and associated RF components, and demodulate the downlink communication 640 into a plurality of OFDM symbols to obtain interleaved OFDM symbol data for each transmitted OFDM symbol. The UE 115-*b* may, at block 645, perform symbol-level deinterleaving of the interleaved OFDM symbol data to obtain deinterleaved OFDM symbol data.

At block 650, the UE 115-*b* may perform symbol concatenation/allocation for the OFDM symbols of the transmitted code block to obtain interleaved code block data of the transmitted code block. The UE 115-*b* may then, at block 655, perform code block level deinterleaving the interleaved code block data to obtain deinterleaved code block data, which may be decoded according to the coding applied at the base station 105-*b* (e.g., turbo decoding or LDPC decoding).

In some examples, the downlink communication 640 may include signaling indicating whether the transmitted code block contains interleaved code block data and interleaved OFDM symbol data. In such cases, the UE 115-*b* may perform a legacy single stage deinterleaving of parity data within the transmitted code block when the signaling does not indicate that the transmitted code block contains interleaved OFDM symbol data, and may perform the dual-stage deinterleaving/decoding when the signaling does indicate that the transmitted code block contains interleaved OFDM symbol data.

Figure 7:
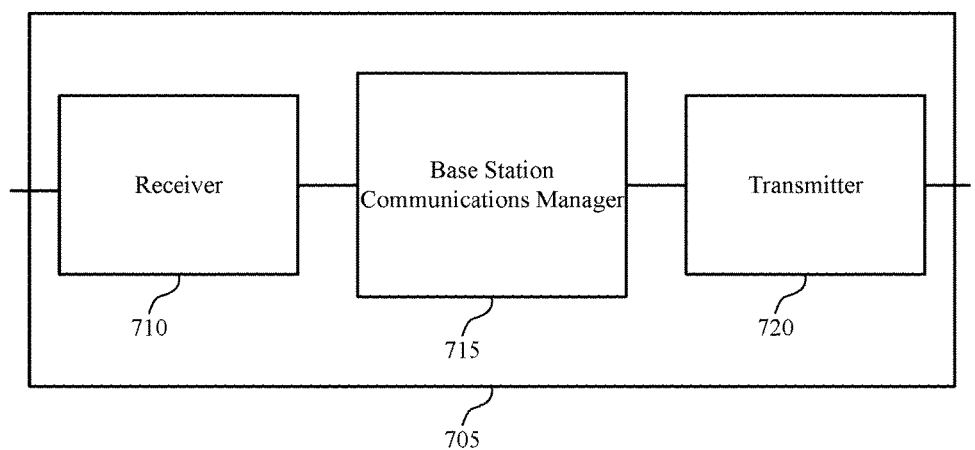
FIGS. 7 through 9 show diagrams of a device that supports dual stage channel interleaving for data transmission in accordance with various aspects of the present disclosure.

FIG. 7 shows a diagram 700 of a wireless device 705 that supports dual stage channel interleaving for data transmission in accordance with various aspects of the present disclosure. Wireless device 705 may be an example of aspects of a base station 105 as described with reference to FIG. 1. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dual stage channel interleaving for data transmission, etc.). Information may be passed on to other components of the device. The receiver 710 may be an example of aspects of the transceiver 1035 described with reference to FIG. 10.

Base station communications manager 715 may be an example of aspects of the base station communications manager 1015 described with reference to FIG. 10. Base station communications manager 715 may identify code block data to be transmitted in a code block to a receiver, interleave the code block data to generate interleaved code block data, concatenate interleaved code block data from different code blocks sequentially, allocate the concatenated interleaved code block data into OFDM symbols sequentially, and interleave the concatenated interleaved code block data allocated into each OFDM symbol to generate interleaved OFDM symbol data to be transmitted in each OFDM symbol. The base station communications manager 715, in some cases, may additionally or alternatively identify code block data to be transmitted in a code block to a receiver, allocate the code block data into a set of OFDM symbols, and interleave the code block data allocated into the OFDM symbols to generate interleaved OFDM symbol data for the OFDM symbols. In some examples, the base station communications manager 715 may interleave the code block data allocated into each of the OFDM symbols to generate interleaved OFDM symbol data for each of the OFDM symbols.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Transmitter 720 may transmit the OFDM symbols to the receiver and transmit the set of other OFDM symbols of the code block to the receiver.

Figure 8:
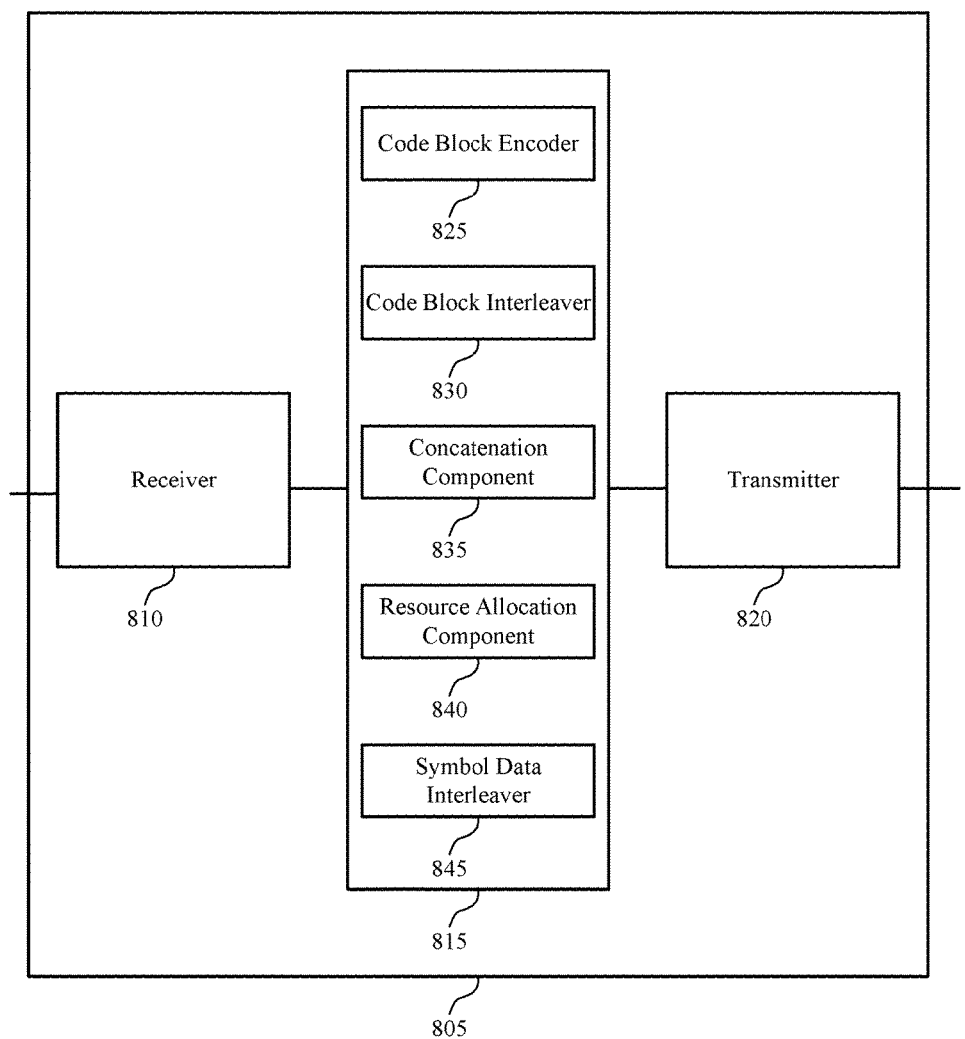

FIG. 8 shows a diagram 800 of a wireless device 805 that supports dual stage channel interleaving for data transmission in accordance with various aspects of the present disclosure. Wireless device 805 may be an example of aspects of a wireless device 705 or a base station 105 as described with reference to FIGS. 1 and 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to dual stage channel interleaving for data transmission, etc.). Information may be passed on to other components of the device. The receiver 810 may be an example of aspects of the transceiver 1035 described with reference to FIG. 10.

Base station communications manager 815 may be an example of aspects of the base station communications manager 1015 described with reference to FIG. 10. Base station communications manager 815 may also include code block encoder 825, code block interleaver 830, concatenation component 835, resource allocation component 840, and symbol data interleaver 845.

Code block encoder 825 may identify code block data to be transmitted in a code block to a receiver. In some cases, the code block data includes turbo code encoded data, LDPC encoded data, or TBCC encoded data.

Code block interleaver 830 may interleave the code block data to generate interleaved code block data, which in some cases may provide interleaving systematic data and parity data within the code block data to provide a uniform distribution of the systematic data in time within the code block. In some cases, the code block interleaver 830 may perform a legacy no channel interleaving or single stage channel interleaving in an absence of receiving an indication that a receiver is capable of supporting two stage channel interleaving. In some cases, the interleaved code block data provides time diversity for the code block data and the interleaved OFDM symbol data provides frequency diversity for the code block data.

Concatenation component 835 may concatenate interleaved code block data from different code blocks sequentially. Such concatenation may be performed, in some examples, by adding sequential interleaved code block data to a buffer.

Resource allocation component 840 may allocate the concatenated interleaved code block data into OFDM symbols sequentially. In some cases, resource allocation component 840 may allocate interleaved code block data from multiple code blocks into a set of other OFDM symbols, and allocate the code block data into a set of OFDM symbols. In some cases, the allocating includes identifying a resource allocation of wireless resources for transmission of the code blocks, the resource allocation including an allocation of the set of OFDM symbols, a set of REs within each OFDM symbol, and a set of spatial layers within each RE.

Symbol data interleaver 845 may interleave the concatenated interleaved code block data allocated into each OFDM symbol to generate interleaved OFDM symbol data to be transmitted in each OFDM symbol. In some cases, the interleaved code block data and interleaved OFDM symbol data may allow pipelined implementation of decoding of the code blocks at the receiver. In some examples, two stage channel interleaving may be performed to generate the interleaved code block data and the interleaved OFDM symbol data when the code block data includes unicast data, and single stage interleaving may be used for broadcast data. In some cases, the interleaved OFDM symbol data provides frequency diversity for the code block data.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
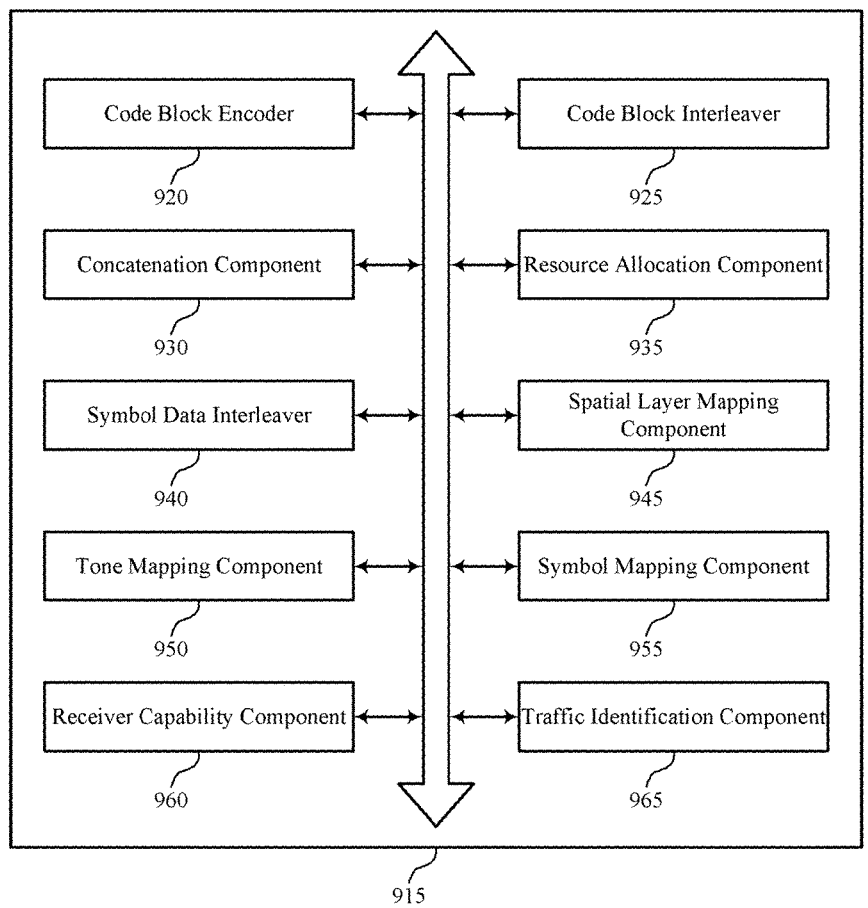

FIG. 9 shows a diagram 900 of a base station communications manager 915 that supports dual stage channel interleaving for data transmission in accordance with various aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include code block encoder 920, code block interleaver 925, concatenation component 930, resource allocation component 935, symbol data interleaver 940, spatial layer mapping component 945, tone mapping component 950, symbol mapping component 955, receiver capability component 960, and traffic identification component 965. Each of these modules may communicate, directly or indirectly, with one another (e.g., via one or more buses).

Code block encoder 920 may identify code block data to be transmitted in a code block to a receiver. In some cases, the code block data includes turbo code encoded data, LDPC encoded data, or TBCC encoded data.

Code block interleaver 925 may interleave the code block data to generate interleaved code block data, which may include interleaving systematic data and parity data within the code block data to provide a uniform distribution of the systematic data in time within the code block. In some cases, receiver capability component 860 may indicate that a receiver is not capable of dual stage interleaving, and the code block interleaver may perform a legacy no channel interleaving or single stage channel interleaving in such cases. In some cases, the interleaved code block data provides time diversity for the code block data and the interleaved OFDM symbol data provides frequency diversity for the code block data.

Concatenation component 930 may concatenate interleaved code block data from different code blocks sequentially, similarly as discussed above.

Resource allocation component 935 may allocate the concatenated interleaved code block data into OFDM symbols sequentially. In some cases, the allocating includes identifying a resource allocation of wireless resources for transmission of the code blocks, the resource allocation including an allocation of the set of OFDM symbols, a set of REs within each OFDM symbol, and a set of spatial layers within each RE.

Symbol data interleaver 940 may interleave the concatenated interleaved code block data allocated into each OFDM symbol to generate interleaved OFDM symbol data to be transmitted in each OFDM symbol. In some cases, the interleaved OFDM symbol data provides frequency diversity for the code block data. In some cases, the interleaved OFDM symbol data allows for pipelined decoding of the code block at the receiver.

Spatial layer mapping component 945, tone mapping component 950, and symbol mapping component 955 may map code block data to provide for pipelined decoding of the code block data. In some cases, the spatial layer mapping component 945 may firstly map the interleaved code block data to one or more spatial layers within a same RE. Tone mapping component 950 may secondly map the interleaved code block data to a set of REs within an OFDM symbol. Symbol mapping component 955 may thirdly map the interleaved code blocks data to the set of OFDM symbols. Following the mapping, two stage interleaving may be used to generate the interleaved code block data and the interleaved OFDM symbol data (e.g., responsive to the receiver indicating that it is capable of supporting two stage interleaving).

Receiver capability component 960 may receive, from the receiver, an indication of whether the receiver is capable of supporting two stage channel interleaving. Such an indication may be received as part of RRC signaling during a connection establishment, for example.

Traffic identification component 965 may determine whether the code block data includes broadcast data to be transmitted to a set of receivers or unicast data to be transmitted to a single receiver and bypass the dual stage interleaving when the code block data includes broadcast data.

Figure 10:
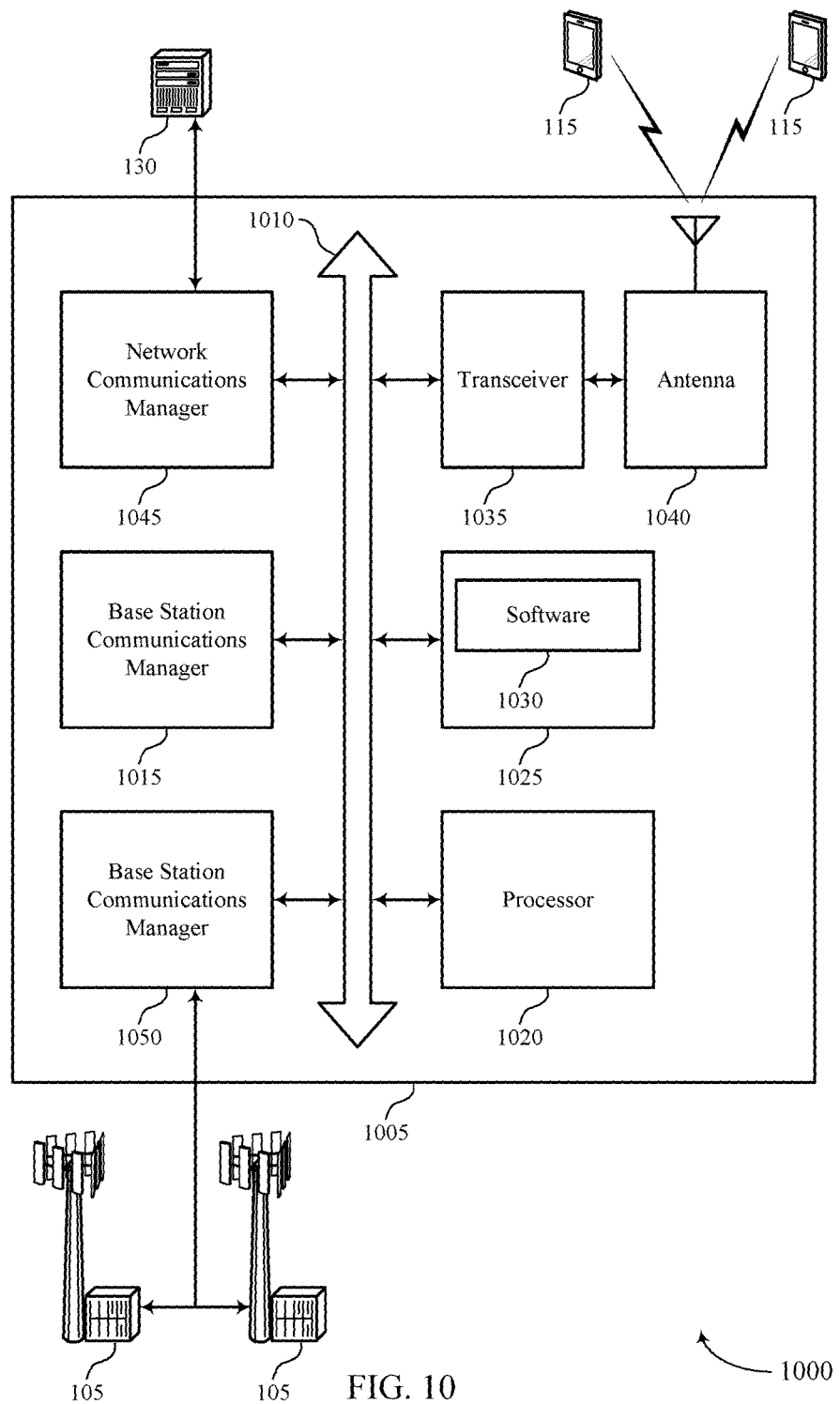
FIG. 10 illustrates a diagram of a system including a base station that supports dual stage channel interleaving for data transmission in accordance with various aspects of the present disclosure.

FIG. 10 shows a diagram of a system 1000 including a device 1005 that supports dual stage channel interleaving for data transmission in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and base station communications manager 1050. These components may be in electronic communication via one or more busses (e.g., bus 1010). Device 1000 may communicate wirelessly with one or more UEs 115.

Base station communications manager 1015 may manage communications with other base station 105, and may include a controller or scheduler for controlling communications with UEs 115 in cooperation with other base stations 105. For example, the base station communications manager 1015 may coordinate scheduling for transmissions to UEs 115 for various interference mitigation techniques such as beamforming or joint transmission. In some examples, base station communications manager 1015 may provide an X2 interface within an LTE/LTE-A wireless communication network technology to provide communication between base stations 105.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting dual stage channel interleaving for data transmission).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a Basic Input-Output system (BIOS) which may control basic hardware and/or software operation such as the interaction with peripheral components or devices.

Software 1030 may include code to implement aspects of the present disclosure, including code to support dual stage channel interleaving for data transmission. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
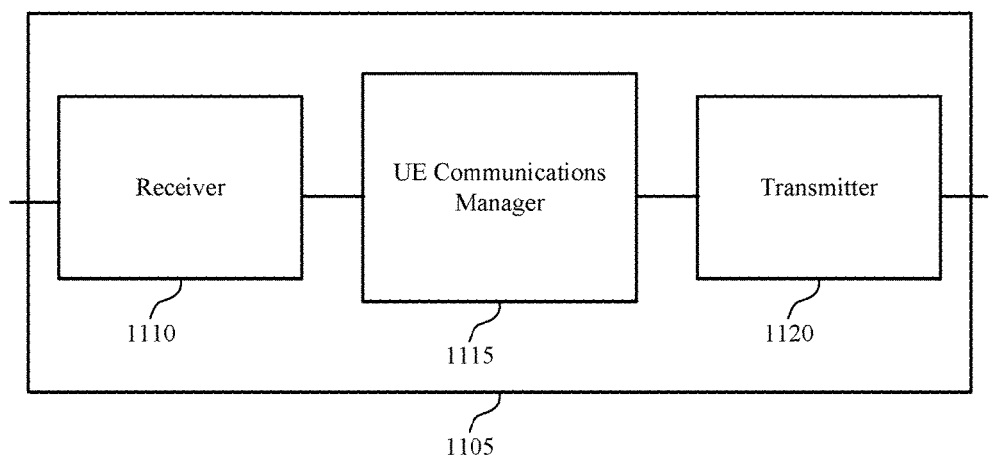
FIGS. 11 through 13 show diagrams of a device that supports dual stage channel interleaving for data transmission in accordance with various aspects of the present disclosure.

FIG. 11 shows a diagram 1100 of a wireless device 1105 that supports dual stage channel interleaving for data transmission in accordance with various aspects of the present disclosure. Wireless device 1105 may be an example of aspects of a UE 115 as described with reference to FIG. 1. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dual stage channel interleaving for data transmission, etc.). Information may be passed on to other components of the device. The receiver 1110 may be an example of aspects of the transceiver 1435 described with reference to FIG. 14. Receiver 1110 may, in some examples, receive a set of OFDM symbols of a transmitted code block.

UE communications manager 1115 may be an example of aspects of the UE communications manager 1415 described with reference to FIG. 14. UE communications manager 1115 may demodulate the set of OFDM symbols to obtain interleaved OFDM symbol data for the set of OFDM symbols, deinterleave the interleaved OFDM symbol data for the set of OFDM symbols to obtain deinterleaved OFDM symbol data for the set of OFDM symbols, concatenate the deinterleaved OFDM symbol data for the set of OFDM symbols of the transmitted code block to obtain interleaved code block data of the transmitted code block, deinterleave the interleaved code block data to obtain deinterleaved code block data, and decode the deinterleaved code block data. In some examples, UE communications manager 1115 may demodulate the set of OFDM symbols to obtain interleaved OFDM symbol data for each of the set of OFDM symbols, deinterleave the interleaved OFDM symbol data for each of the set of OFDM symbols to obtain deinterleaved OFDM symbol data for each of the set of OFDM symbols, concatenate the deinterleaved OFDM symbol data for each of the set of OFDM symbols of the transmitted code block to obtain interleaved code block data of the transmitted code block, deinterleave the interleaved code block data to obtain deinterleaved code block data, and decode the deinterleaved code block data.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
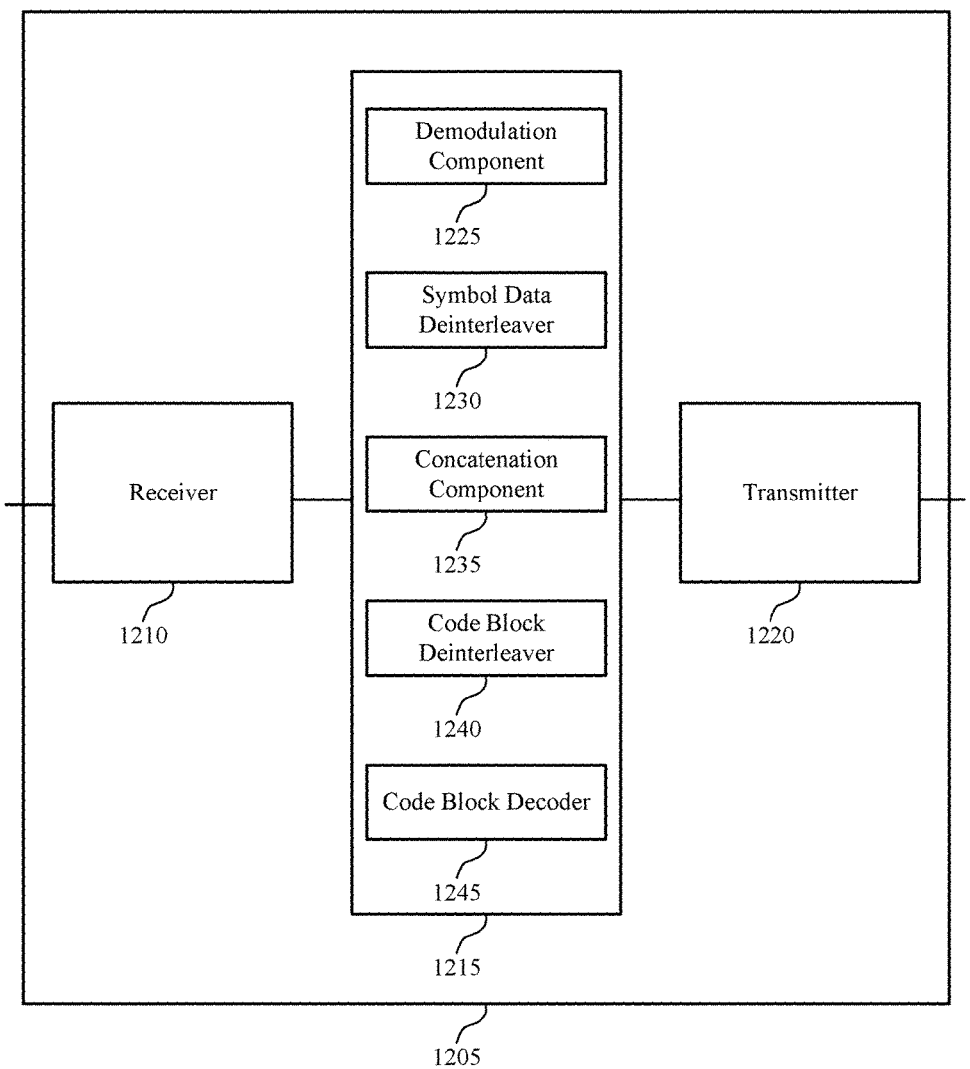

FIG. 12 shows a diagram 1200 of a wireless device 1205 that supports dual stage channel interleaving for data transmission in accordance with various aspects of the present disclosure. Wireless device 1205 may be an example of aspects of a wireless device 1105 or a UE 115 as described with reference to FIGS. 1 and 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to dual stage channel interleaving for data transmission, etc.). Information may be passed on to other components of the device. The receiver 1210 may be an example of aspects of the transceiver 1435 described with reference to FIG. 14.

UE communications manager 1215 may be an example of aspects of the UE communications manager 1415 described with reference to FIG. 14. UE communications manager 1215 may also include demodulation component 1225, symbol data deinterleaver 1230, concatenation component 1235, code block deinterleaver 1240, and code block decoder 1245.

Demodulation component 1225 may demodulate the set of OFDM symbols to obtain interleaved OFDM symbol data for each of a set of OFDM symbols.

Symbol data deinterleaver 1230 may deinterleave the interleaved OFDM symbol data for the set of OFDM symbols to obtain deinterleaved OFDM symbol data. In some examples, data deinterleaver 1230 may deinterleave the interleaved OFDM symbol data for all of the set of OFDM symbols to obtain deinterleaved OFDM symbol data. Such deinterleaving may be performed using a linear deinterleaver, for example, although other types of deinterleavers may be used based on a type of interleaving used for the interleaved OFDM symbol data, as discussed above.

Concatenation component 1235 may concatenate the deinterleaved OFDM symbol data for the set of OFDM symbols of the transmitted code block to obtain interleaved code block data of the transmitted code block. In some cases, concatenation component 1235 may concatenate the deinterleaved OFDM symbol data for one or more of the set of OFDM symbols of the transmitted code block to obtain interleaved code block data of the transmitted code block. Concatenation may include, for example, adding the deinterleaved OFDM symbol data for the set of OFDM symbols to a buffer.

Code block deinterleaver 1240 may deinterleave the interleaved code block data to obtain deinterleaved code block data. Such deinterleaving may be performed using a linear deinterleaver, for example, although other types of deinterleavers may be used based on a type of interleaving used for the interleaved OFDM symbol data, as discussed above. In some examples, code block deinterleaver 1240 may perform a legacy single stage deinterleaving of parity data within the transmitted code block when signaling does not indicate that the transmitted code block contains interleaved OFDM symbol data.

Code block decoder 1245 may decode the deinterleaved code block data. In some cases, the interleaved code block data includes interleaved systematic data and parity data within the code block, and where the systematic data is uniformly distributed throughout the interleaved code block data. In some cases, the interleaved code block data provides time diversity for the deinterleaved code block data and the interleaved OFDM symbol data provides frequency diversity for the deinterleaved code block data. In some cases, the decoding the deinterleaved code block data includes decoding of turbo code encoded data, LDPC encoded data, or TBCC encoded data. In some cases, the decoding the deinterleaved code block data includes pipelined decoding of the code block.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
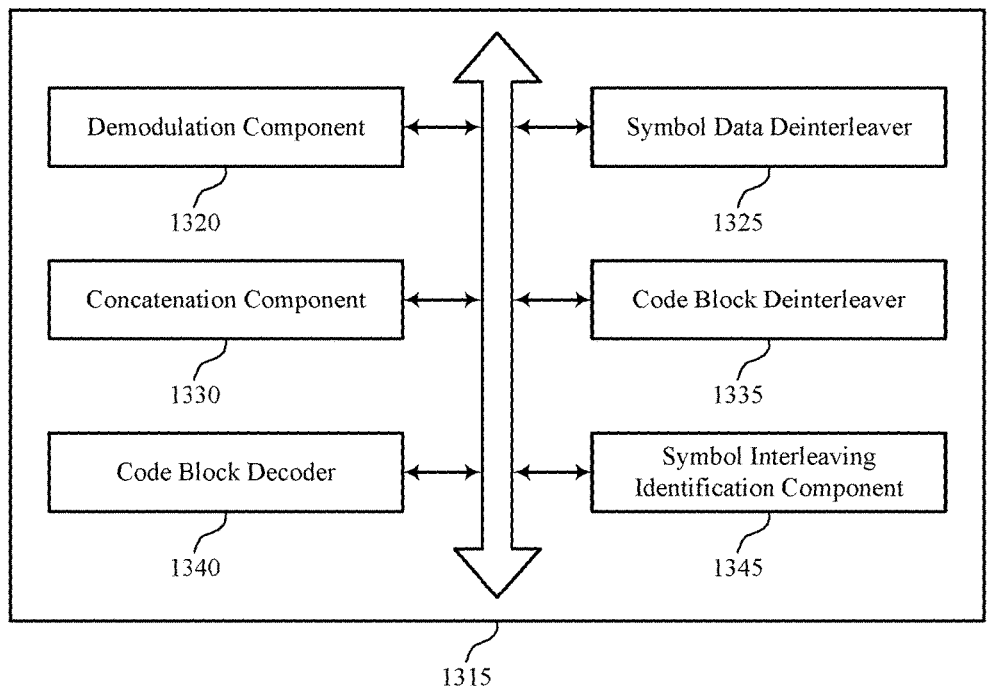

FIG. 13 shows a diagram 1300 of a UE communications manager 1315 that supports dual stage channel interleaving for data transmission in accordance with various aspects of the present disclosure. The UE communications manager 1315 may be an example of aspects of a UE communications manager 1415 described with reference to FIGS. 11, 12, and 14. The UE communications manager 1315 may include demodulation component 1320, symbol data deinterleaver 1325, concatenation component 1330, code block deinterleaver 1335, code block decoder 1340, and symbol interleaving identification component 1345. Each of these modules may communicate, directly or indirectly, with one another (e.g., via one or more buses).

Demodulation component 1320 may demodulate the set of OFDM symbols to obtain interleaved OFDM symbol data for the set of OFDM symbols. In some cases, the set of OFDM symbols may be demodulated to obtain interleaved OFDM symbol data for at least one of the set of OFDM symbols.

Symbol data deinterleaver 1325 may deinterleave the interleaved OFDM symbol data for each of the set of OFDM symbols to obtain deinterleaved OFDM symbol data for each of the set of OFDM symbols. Such deinterleaving may be performed using a linear deinterleaver, for example, although other types of deinterleavers may be used based on a type of interleaving used for the interleaved OFDM symbol data, as discussed above.

Concatenation component 1330 may concatenate the deinterleaved OFDM symbol data for each of the set of OFDM symbols of the transmitted code block to obtain interleaved code block data of the transmitted code block. Concatenation may include, for example, adding the deinterleaved OFDM symbol data for each of the set of OFDM symbols to a buffer.

Code block deinterleaver 1335 may deinterleave the interleaved code block data to obtain deinterleaved code block data. In examples where signaling does not indicate that the transmitted code block contains interleaved OFDM symbol data, the code block deinterleaver 1335 may perform a legacy single stage deinterleaving of parity data within the transmitted code block. Such deinterleaving may be performed using a linear deinterleaver, for example, although other types of deinterleavers may be used based on a type of interleaving used for the interleaved OFDM symbol data, as discussed above.

Code block decoder 1340 may decode the deinterleaved code block data. In some cases, the interleaved code block data includes interleaved systematic data and parity data within the code block, and where the systematic data is uniformly distributed throughout the interleaved code block data. In some cases, the interleaved code block data provides time diversity for the deinterleaved code block data and the interleaved OFDM symbol data provides frequency diversity for the deinterleaved code block data. In some cases, the decoding the deinterleaved code block data includes decoding of turbo code encoded data, LDPC encoded data, or TBCC encoded data. In some cases, the decoding the deinterleaved code block data includes pipelined decoding of the code block.

Symbol interleaving identification component 1345 may transmit an indication to a transmitter of the transmitted code block that indicates capability for supporting the two stage channel interleaving and receive signaling indicating whether the transmitted code block contains interleaved code block data and interleaved OFDM symbol data.

Figure 14:
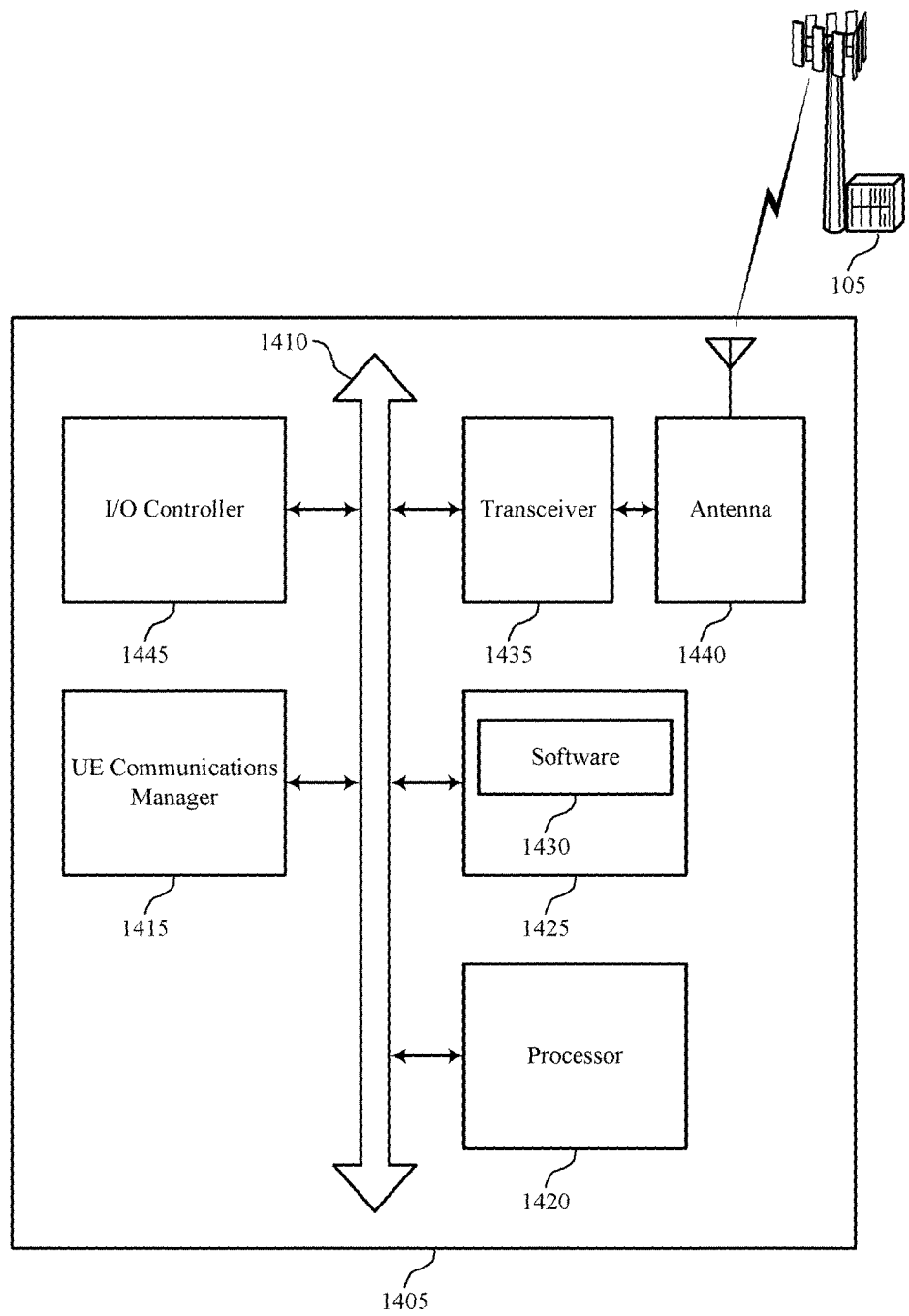
FIG. 14 illustrates a diagram of a system including a UE that supports dual stage channel interleaving for data transmission in accordance with various aspects of the present disclosure.

FIG. 14 shows a diagram of a system 1400 including a device 1405 that supports dual stage channel interleaving for data transmission in accordance with various aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more busses (e.g., bus 1410). Device 1400 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting dual stage channel interleaving for data transmission). 1420.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support dual stage channel interleaving for data transmission. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may additionally or alternatively manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
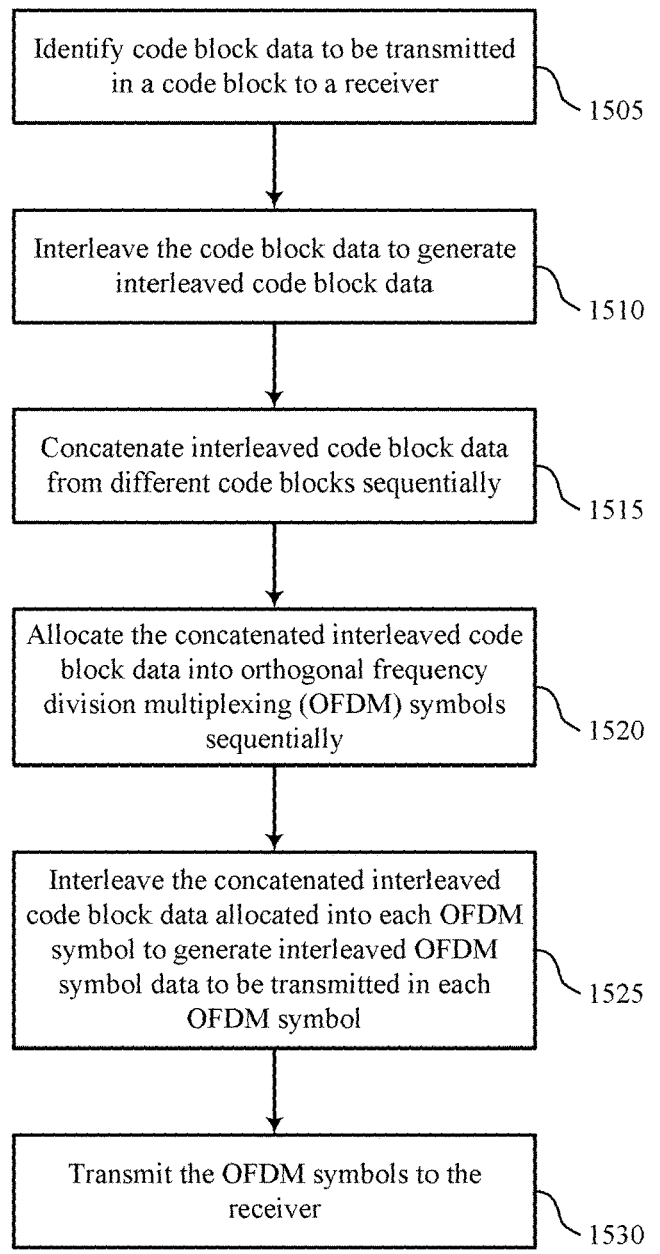
FIGS. 15 through 22 illustrate methods for dual stage channel interleaving for data transmission in accordance with various aspects of the present disclosure.

FIG. 15 shows a flowchart illustrating a method 1500 for dual stage channel interleaving for data transmission in accordance with various aspects of the present disclosure. The operations of method 1500 may be implemented by a base station 105, a UE 115, or its components as described herein. For example, the operations of method 1500 may be performed by a base station communications manager as described with reference to FIGS. 7 through 10. In some examples, a base station 105 or UE 115 may execute a set of codes to control the functional elements of the device to perform the functions described below. Additionally or alternatively, the base station 105 or UE 115 may perform aspects the functions described below using special-purpose hardware.

At block 1505 the base station 105 or UE 115 may identify code block data to be transmitted in a code block to a receiver. The operations of block 1505 may be performed according to the methods described with reference to FIGS. 1 through 6. In some examples, aspects of the operations of block 1505 may be performed by a code block encoder as described with reference to FIGS. 7 through 10.

At block 1510 the base station 105 or UE 115 may interleave the code block data to generate interleaved code block data. The operations of block 1510 may be performed according to the methods described with reference to FIGS. 1 through 6. In some examples, aspects of the operations of block 1510 may be performed by a code block interleaver as described with reference to FIGS. 7 through 10.

At block 1515 the base station 105 or UE 115 may concatenate interleaved code block data from different code blocks sequentially. The operations of block 1515 may be performed according to the methods described with reference to FIGS. 1 through 6. In some examples, aspects of the operations of block 1515 may be performed by a concatenation component as described with reference to FIGS. 7 through 10.

At block 1520 the base station 105 or UE 115 may allocate the concatenated interleaved code block data into OFDM symbols sequentially. The operations of block 1520 may be performed according to the methods described with reference to FIGS. 1 through 6. In some examples, aspects of the operations of block 1520 may be performed by a resource allocation component as described with reference to FIGS. 7 through 10.

At block 1525 the base station 105 or UE 115 may interleave the concatenated interleaved code block data allocated into each OFDM symbol to generate interleaved OFDM symbol data to be transmitted in each OFDM symbol. The operations of block 1525 may be performed according to the methods described with reference to FIGS. 1 through 6. In some examples, aspects of the operations of block 1525 may be performed by a symbol data interleaver as described with reference to FIGS. 7 through 10.

At block 1530 the base station 105 or UE 115 may transmit the OFDM symbols to the receiver. The operations of block 1530 may be performed according to the methods described with reference to FIGS. 1 through 6. In some examples, aspects of the operations of block 1530 may be performed by a transmitter as described with reference to FIGS. 7 through 10.

Figure 16:
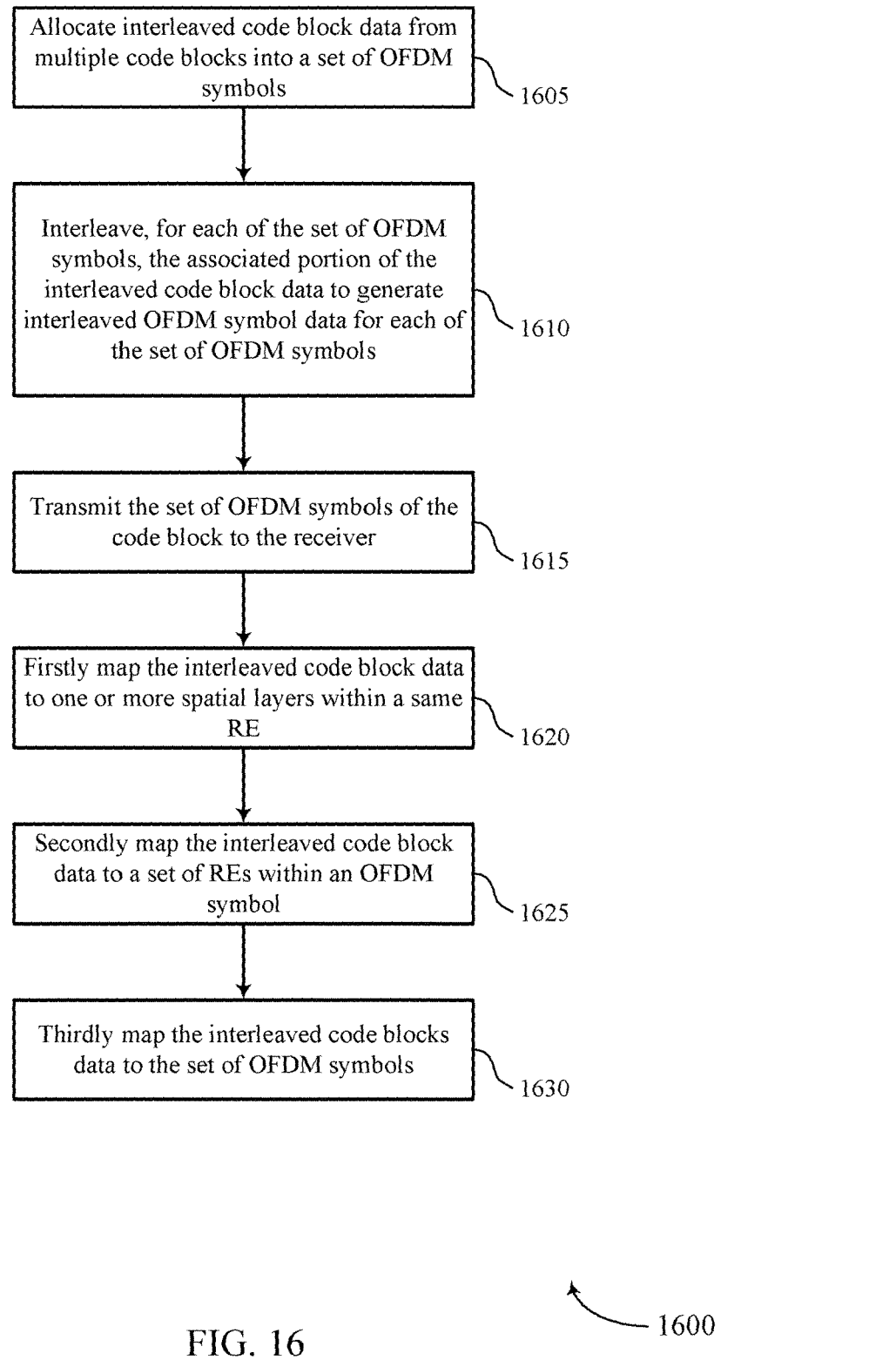

FIG. 16 shows a flowchart illustrating a method 1600 for dual stage channel interleaving for data transmission in accordance with various aspects of the present disclosure. The operations of method 1600 may be implemented by a base station 105 or its components as described herein. For example, the operations of method 1600 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may allocate interleaved code block data from multiple code blocks into a set of OFDM symbols. The operations of block 1605 may be performed according to the methods described with reference to FIGS. 1 through 6. In some examples, aspects of the operations of block 1605 may be performed by a resource allocation component as described with reference to FIGS. 7 through 10.

At block 1610 the base station 105 may interleave, for each of the set of OFDM symbols, the associated portion of the interleaved code block data to generate interleaved OFDM symbol data for each of the set of OFDM symbols. The operations of block 1610 may be performed according to the methods described with reference to FIGS. 1 through 6. In some examples, aspects of the operations of block 1610 may be performed by a symbol data interleaver as described with reference to FIGS. 7 through 10.

At block 1615 the base station 105 may transmit the set of OFDM symbols of the code block to the receiver. The operations of block 1615 may be performed according to the methods described with reference to FIGS. 1 through 6. In some examples, aspects of the operations of block 1615 may be performed by a transmitter as described with reference to FIGS. 7 through 10.

At block 1620 the base station 105 may firstly map the interleaved code block data to one or more spatial layers within a same RE. The operations of block 1620 may be performed according to the methods described with reference to FIGS. 1 through 6. In some examples, aspects of the operations of block 1620 may be performed by a spatial layer mapping component as described with reference to FIGS. 7 through 10.

At block 1625 the base station 105 may secondly map the interleaved code block data to a plurality of REs within an OFDM symbol. The operations of block 1625 may be performed according to the methods described with reference to FIGS. 1 through 6. In some examples, aspects of the operations of block 1625 may be performed by a tone mapping component as described with reference to FIGS. 7 through 10.

At block 1630 the base station 105 may thirdly map the interleaved code blocks data to the plurality of OFDM symbols. The operations of block 1630 may be performed according to the methods described with reference to FIGS. 1 through 6. In some examples, aspects of the operations of block 1630 may be performed by a symbol mapping component as described with reference to FIGS. 7 through 10.

Figure 17:
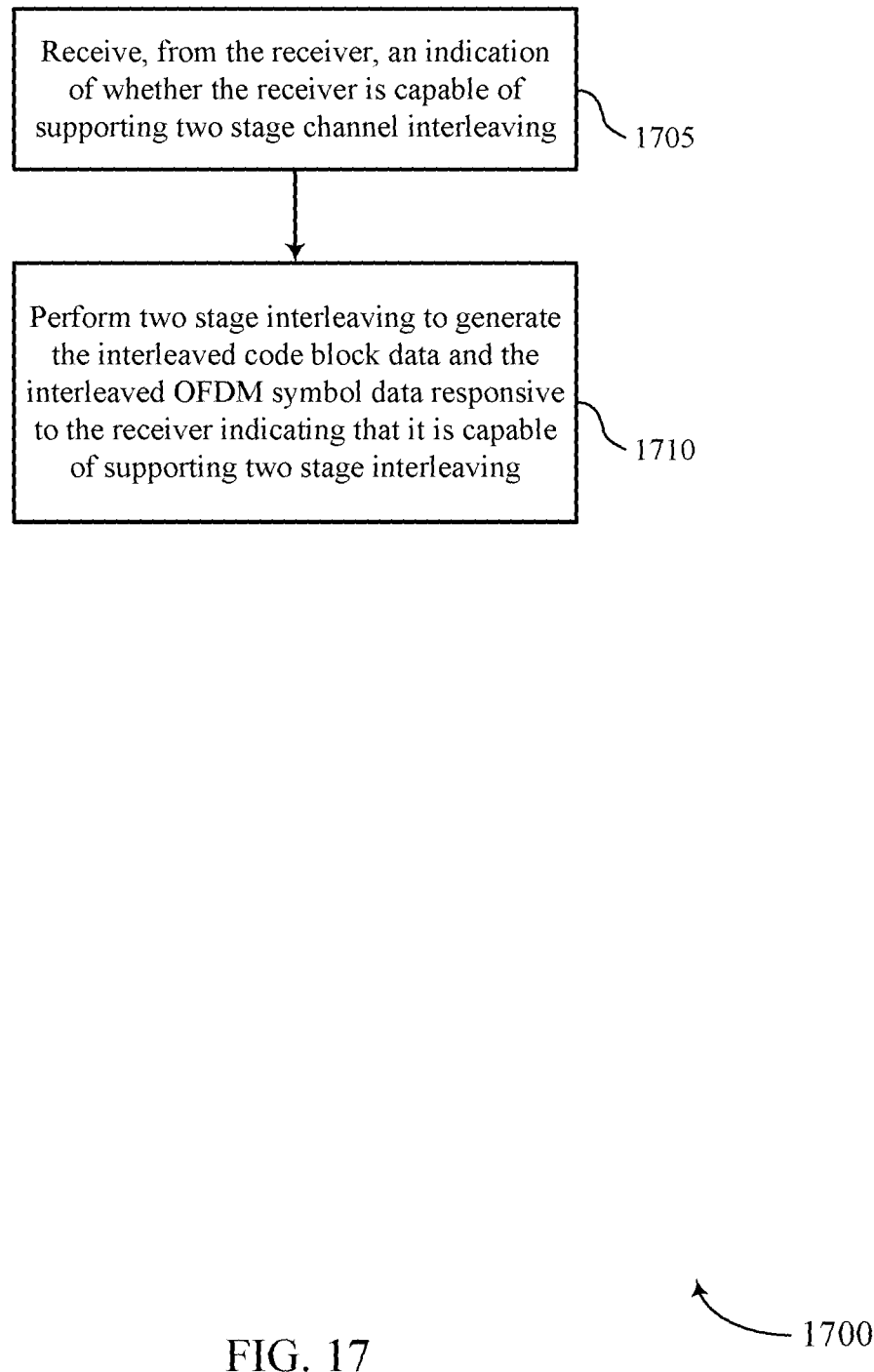

FIG. 17 shows a flowchart illustrating a method 1700 for dual stage channel interleaving for data transmission in accordance with various aspects of the present disclosure. The operations of method 1700 may be implemented by a base station 105 or its components as described herein. For example, the operations of method 1700 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may receive, from the receiver, an indication of whether the receiver is capable of supporting two stage channel interleaving. The operations of block 1705 may be performed according to the methods described with reference to FIGS. 1 through 6. In some examples, aspects of the operations of block 1705 may be performed by a receiver capability component as described with reference to FIGS. 7 through 10.

At block 1710 the base station 105 may perform two stage interleaving to generate the interleaved code block data and the interleaved OFDM symbol data responsive to the receiver indicating that it is capable of supporting two stage interleaving. The operations of block 1710 may be performed according to the methods described with reference to FIGS. 1 through 6. In some examples, aspects of the operations of block 1710 may be performed by a symbol mapping component as described with reference to FIGS. 7 through 10.

Figure 18:
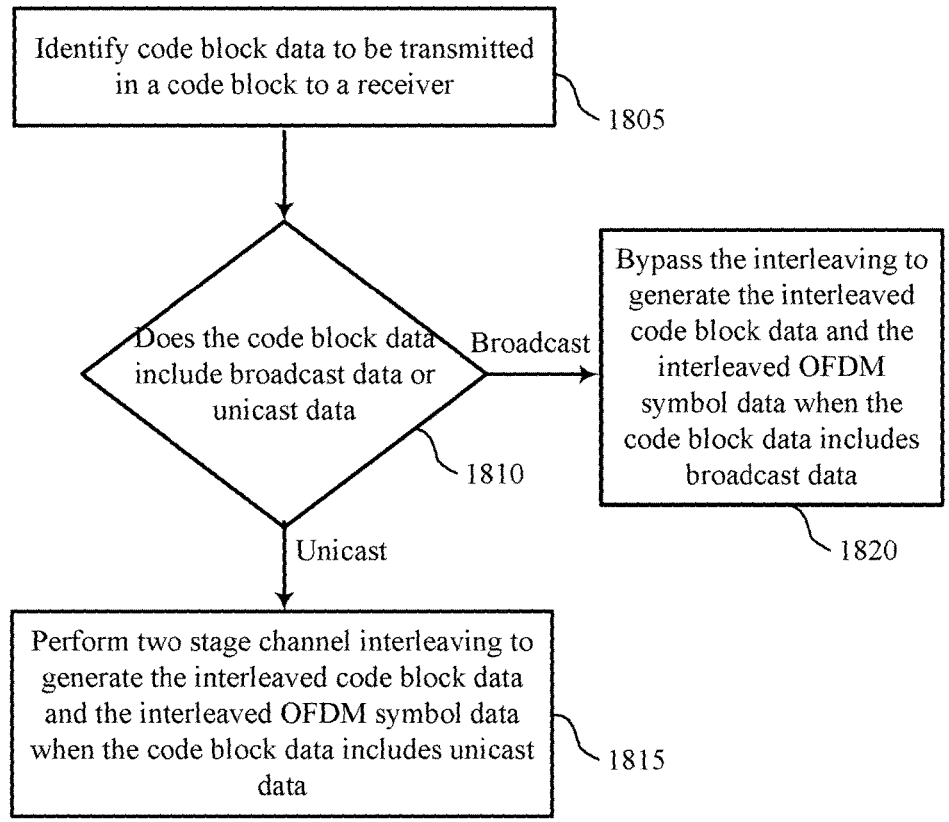

FIG. 18 shows a flowchart illustrating a method 1800 for dual stage channel interleaving for data transmission in accordance with various aspects of the present disclosure. The operations of method 1800 may be implemented by a base station 105 or its components as described herein. For example, the operations of method 1800 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may identify code block data to be transmitted in a code block to a receiver. The operations of block 1805 may be performed according to the methods described with reference to FIGS. 1 through 6. In some examples, aspects of the operations of block 1805 may be performed by a code block encoder as described with reference to FIGS. 7 through 10.

At block 1810 the base station 105 may determine whether the code block data includes broadcast data to be transmitted to a plurality of receivers or unicast data to be transmitted to a single receiver. The operations of block 1810 may be performed according to the methods described with reference to FIGS. 1 through 6. In some examples, aspects of the operations of block 1810 may be performed by a traffic identification component as described with reference to FIGS. 7 through 10.

At block 1815 the base station 105 may perform two stage channel interleaving to generate the interleaved code block data and the interleaved OFDM symbol data when the code block data includes unicast data. The operations of block 1815 may be performed according to the methods described with reference to FIGS. 1 through 6. In some examples, aspects of the operations of block 1815 may be performed by a symbol data interleaver as described with reference to FIGS. 7 through 10.

At block 1820 the base station 105 may bypass the interleaving to generate the interleaved code block data and the interleaved OFDM symbol data when the code block data includes broadcast data. The operations of block 1820 may be performed according to the methods described with reference to FIGS. 1 through 6. In some examples, aspects of the operations of block 1820 may be performed by a traffic identification component as described with reference to FIGS. 7 through 10.

Figure 19:
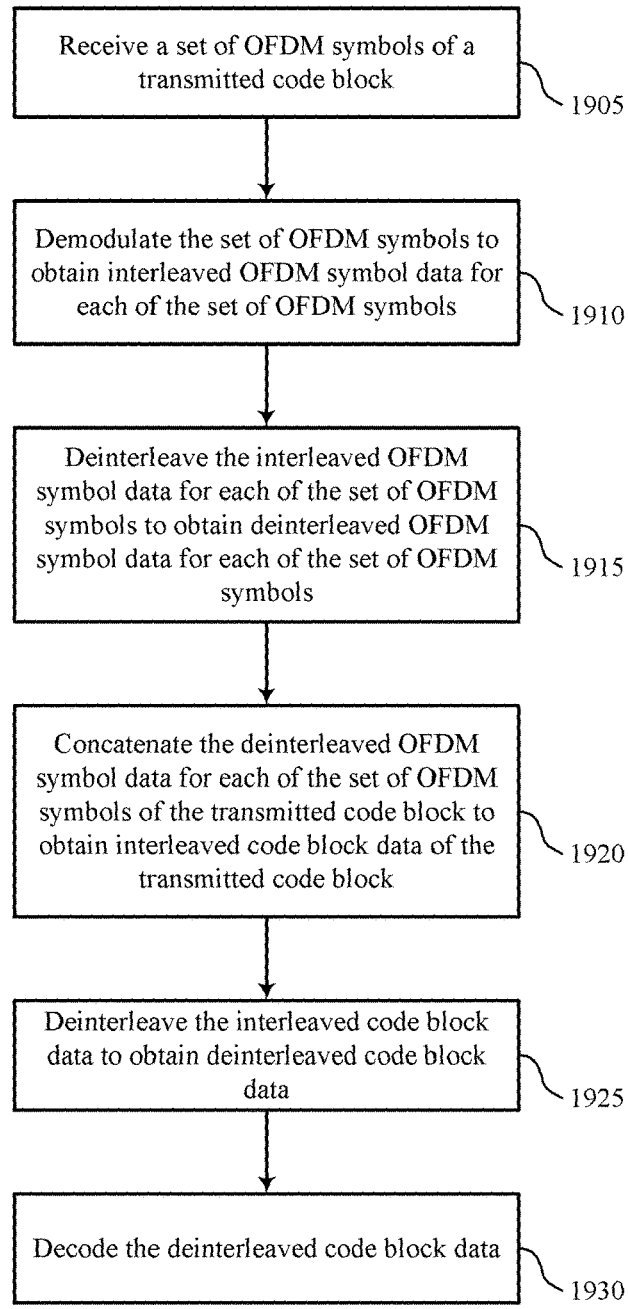

FIG. 19 shows a flowchart illustrating a method 1900 for dual stage channel interleaving for data transmission in accordance with various aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive a plurality of OFDM symbols of a transmitted code block. The operations of block 1905 may be performed according to the methods described with reference to FIGS. 1 through 6. In some examples, aspects of the operations of block 1905 may be performed by a receiver as described with reference to FIGS. 11 through 14.

At block 1910 the UE 115 may demodulate the plurality of OFDM symbols to obtain interleaved OFDM symbol data for each of the plurality of OFDM symbols. The operations of block 1910 may be performed according to the methods described with reference to FIGS. 1 through 6. In some examples, aspects of the operations of block 1910 may be performed by a demodulation component as described with reference to FIGS. 11 through 14.

At block 1915 the UE 115 may deinterleave the interleaved OFDM symbol data for each of the plurality of OFDM symbols to obtain deinterleaved OFDM symbol data for each of the plurality of OFDM symbols. The operations of block 1915 may be performed according to the methods described with reference to FIGS. 1 through 6. In some examples, aspects of the operations of block 1915 may be performed by a symbol data deinterleaver as described with reference to FIGS. 11 through 14.

At block 1920 the UE 115 may concatenate the deinterleaved OFDM symbol data for each of the plurality of OFDM symbols of the transmitted code block to obtain interleaved code block data of the transmitted code block. The operations of block 1920 may be performed according to the methods described with reference to FIGS. 1 through 6. In some examples, aspects of the operations of block 1920 may be performed by a concatenation component as described with reference to FIGS. 11 through 14.

At block 1925 the UE 115 may deinterleave the interleaved code block data to obtain deinterleaved code block data. The operations of block 1925 may be performed according to the methods described with reference to FIGS. 1 through 6. In some examples, aspects of the operations of block 1925 may be performed by a code block deinterleaver as described with reference to FIGS. 11 through 14.

At block 1930 the UE 115 may decode the deinterleaved code block data. The operations of block 1930 may be performed according to the methods described with reference to FIGS. 1 through 6. In some examples, aspects of the operations of block 1930 may be performed by a code block decoder as described with reference to FIGS. 11 through 14.

Figure 20:
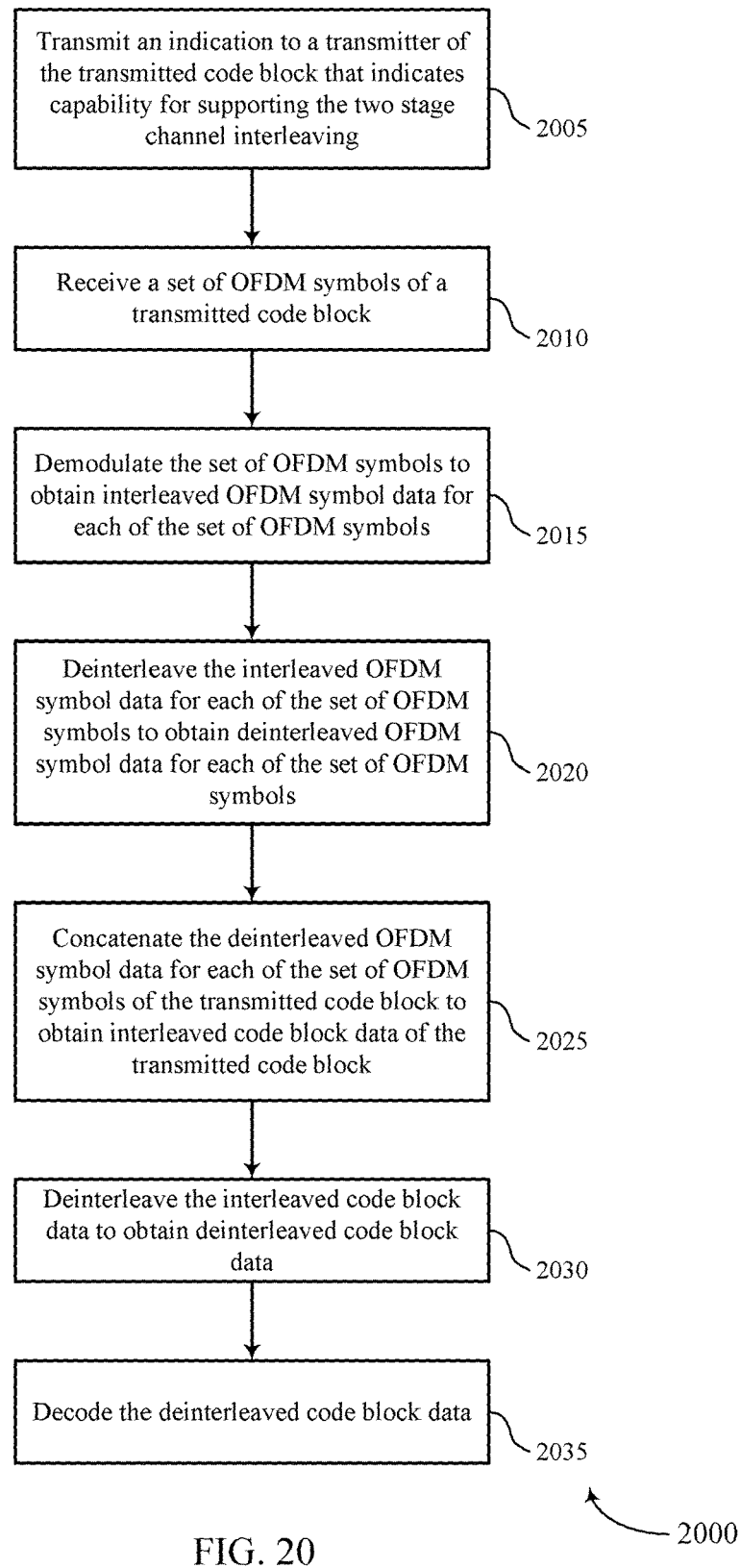

FIG. 20 shows a flowchart illustrating a method 2000 for dual stage channel interleaving for data transmission in accordance with various aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may transmit an indication to a transmitter of the transmitted code block that indicates capability for supporting the two stage channel interleaving. The operations of block 2005 may be performed according to the methods described with reference to FIGS. 1 through 6. In some examples, aspects of the operations of block 2005 may be performed by a symbol interleaving identification component as described with reference to FIGS. 11 through 14.

At block 2010 the UE 115 may receive a set of OFDM symbols of a transmitted code block. The operations of block 2010 may be performed according to the methods described with reference to FIGS. 1 through 6. In some examples, aspects of the operations of block 2010 may be performed by a receiver as described with reference to FIGS. 11 through 14.

At block 2015 the UE 115 may demodulate the set of OFDM symbols to obtain interleaved OFDM symbol data for each of the set of OFDM symbols. The operations of block 2015 may be performed according to the methods described with reference to FIGS. 1 through 6. In some examples, aspects of the operations of block 2015 may be performed by a demodulation component as described with reference to FIGS. 11 through 14.

At block 2020 the UE 115 may deinterleave the interleaved OFDM symbol data for each of the set of OFDM symbols to obtain deinterleaved OFDM symbol data for each of the set of OFDM symbols. The operations of block 2020 may be performed according to the methods described with reference to FIGS. 1 through 6. In some examples, aspects of the operations of block 2020 may be performed by a symbol data deinterleaver as described with reference to FIGS. 11 through 14.

At block 2025 the UE 115 may concatenate the deinterleaved OFDM symbol data for each of the set of OFDM symbols of the transmitted code block to obtain interleaved code block data of the transmitted code block. The operations of block 2025 may be performed according to the methods described with reference to FIGS. 1 through 6. In some examples, aspects of the operations of block 2025 may be performed by a concatenation component as described with reference to FIGS. 11 through 14.

At block 2030 the UE 115 may deinterleave the interleaved code block data to obtain deinterleaved code block data. The operations of block 2030 may be performed according to the methods described with reference to FIGS. 1 through 6. In some examples, aspects of the operations of block 2030 may be performed by a code block deinterleaver as described with reference to FIGS. 11 through 14.

At block 2035 the UE 115 may decode the deinterleaved code block data. The operations of block 2035 may be performed according to the methods described with reference to FIGS. 1 through 6. In some examples, aspects of the operations of block 2035 may be performed by a code block decoder as described with reference to FIGS. 11 through 14.

Figure 21:
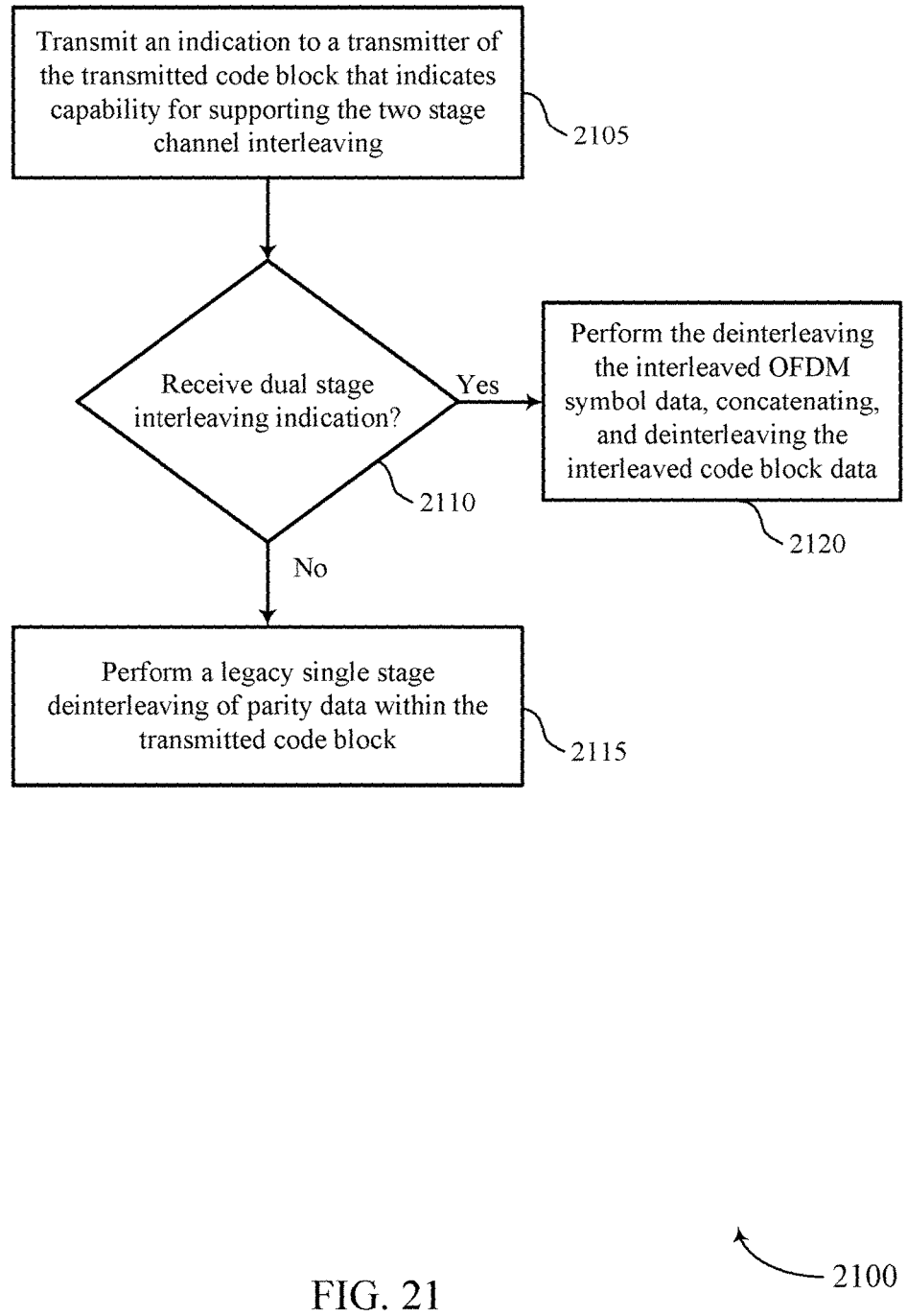

FIG. 21 shows a flowchart illustrating a method 2100 for dual stage channel interleaving for data transmission in accordance with various aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may transmit an indication to a transmitter of the transmitted code block that indicates capability for supporting the two stage channel interleaving. The operations of block 2105 may be performed according to the methods described with reference to FIGS. 1 through 6. In some examples, aspects of the operations of block 2105 may be performed by a symbol interleaving identification component as described with reference to FIGS. 11 through 14.

At block 2110 the UE 115 may receive signaling indicating whether the transmitted code block contains dual stage interleaving with interleaved code block data and interleaved OFDM symbol data. The operations of block 2110 may be performed according to the methods described with reference to FIGS. 1 through 6. In some examples, aspects of the operations of block 2110 may be performed by a symbol interleaving identification component as described with reference to FIGS. 11 through 14.

At block 2115 the UE 115 may perform a legacy single stage deinterleaving of parity data within the transmitted code block when the signaling does not indicate that the transmitted code block contains interleaved OFDM symbol data. The operations of block 2115 may be performed according to the methods described with reference to FIGS. 1 through 6. In some examples, aspects of the operations of block 2115 may be performed by a code block deinterleaver as described with reference to FIGS. 11 through 14.

At block 2120 the UE 115 may perform the deinterleaving the interleaved OFDM symbol data, concatenating, and deinterleaving the interleaved code block data when the signaling does indicate that the transmitted code block contains interleaved OFDM symbol data. The operations of block 2120 may be performed according to the methods described with reference to FIGS. 1 through 6. In some examples, aspects of the operations of block 2120 may be performed by a symbol data deinterleaver as described with reference to FIGS. 11 through 14.

Figure 22:
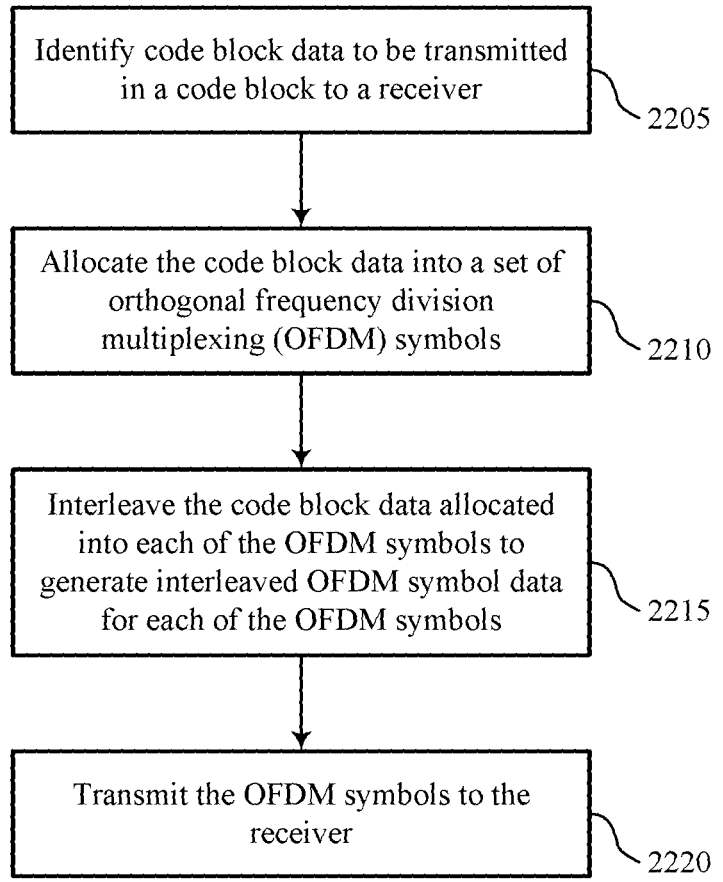

FIG. 22 shows a flowchart illustrating a method 2200 for dual stage channel interleaving for data transmission in accordance with various aspects of the present disclosure. The operations of method 2200 may be implemented by a base station 105 or its components as described herein. For example, the operations of method 2200 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 2205 the base station 105 may identify code block data to be transmitted in a code block to a receiver. The operations of block 2205 may be performed according to the methods described with reference to FIGS. 1 through 6. In some examples, aspects of the operations of block 2205 may be performed by a code block encoder as described with reference to FIGS. 7 through 10.

At block 2210 the base station 105 may allocate the code block data into a plurality of OFDM symbols. The operations of block 2210 may be performed according to the methods described with reference to FIGS. 1 through 6. In some examples, aspects of the operations of block 2210 may be performed by a resource allocation component as described with reference to FIGS. 7 through 10.

At block 2215 the base station 105 may interleave the code block data allocated into each of the OFDM symbols to generate interleaved OFDM symbol data for each of the OFDM symbols. The operations of block 2215 may be performed according to the methods described with reference to FIGS. 1 through 6. In some examples, aspects of the operations of block 2215 may be performed by a symbol data interleaver as described with reference to FIGS. 7 through 10.

At block 2220 the base station 105 may transmit the OFDM symbols to the receiver. The operations of block 2220 may be performed according to the methods described with reference to FIGS. 1 through 6. In some examples, aspects of the operations of block 2220 may be performed by a transmitter as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may additionally or alternatively be called forward link transmissions while the uplink transmissions may additionally or alternatively be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying code block data to be transmitted in a code block to a receiver;
   interleaving the code block data to generate interleaved code block data;
   concatenating interleaved code block data from different code blocks sequentially;
   allocating the concatenated interleaved code block data into orthogonal frequency division multiplexing (OFDM) symbols sequentially;
   interleaving the concatenated interleaved code block data allocated into each OFDM symbol to generate interleaved OFDM symbol data to be transmitted in each OFDM symbol; and
   transmitting the OFDM symbols to the receiver.

2. The method of claim 1, wherein interleaving the code block data comprises:
   interleaving the code block data comprises interleaving systematic data and parity data within the code block data to provide a uniform distribution of the systematic data in time within the code block.

3. The method of claim 1, wherein the interleaved code block data provides time diversity for the code block data and the interleaved OFDM symbol data provides frequency diversity for the code block data.

4. The method of claim 1, wherein the code block data comprises turbo code encoded data, low density parity check (LDPC) encoded data, or tail-biting convolutional code (TBCC) encoded data.

5. The method of claim 1, further comprising:
   allocating interleaved code block data from multiple code blocks into a plurality of other OFDM symbols;
   interleaving, for the plurality of other OFDM symbols, the associated portion of the interleaved code block data to generate interleaved OFDM symbol data for the plurality of other OFDM symbols; and
   transmitting the plurality of other OFDM symbols of the code block to the receiver.

6. The method of claim 5, wherein interleaving within the code block and interleaving within the OFDM symbols allow pipelined implementation of decoding of the code blocks at the receiver.

7. The method of claim 5, wherein the allocating comprises:
   identifying a resource allocation of wireless resources for transmission of the code blocks, the resource allocation including an allocation of the plurality of OFDM symbols, a plurality of resource elements (REs) within each OFDM symbol, and a set of spatial layers within each RE;
   firstly mapping the interleaved code block data to one or more spatial layers within a same RE;
   secondly mapping the interleaved code block data to a plurality of REs within an OFDM symbol; and
   thirdly mapping the interleaved code block data to the plurality of OFDM symbols.

8. The method of claim 1, further comprising:
receiving, from the receiver, an indication of whether the receiver is capable of supporting two stage channel interleaving; and
performing two stage interleaving to generate the interleaved code block data and the interleaved OFDM symbol data responsive to the receiver indicating that it is capable of supporting two stage interleaving.

9. The method of claim 8, further comprising:
performing a legacy no channel interleaving or single stage channel interleaving in an absence of receiving an indication that the receiver is capable of supporting two stage channel interleaving.

10. The method of claim 1, further comprising:
determining whether the code block data includes broadcast data to be transmitted to a plurality of receivers or unicast data to be transmitted to a single receiver;
performing two stage channel interleaving to generate the interleaved code block data and the interleaved OFDM symbol data when the code block data includes unicast data; and
bypassing the interleaving to generate the interleaved code block data and the interleaved OFDM symbol data when the code block data includes broadcast data.

11. A method for wireless communication, comprising:
receiving a plurality of OFDM symbols of a transmitted code block;
demodulating the plurality of OFDM symbols to obtain interleaved OFDM symbol data for the plurality of OFDM symbols;
deinterleaving the interleaved OFDM symbol data for the plurality of OFDM symbols to obtain deinterleaved OFDM symbol data for the plurality of OFDM symbols;
concatenating the deinterleaved OFDM symbol data for the plurality of OFDM symbols of the transmitted code block to obtain interleaved code block data of the transmitted code block;
deinterleaving the interleaved code block data to obtain deinterleaved code block data; and
decoding the deinterleaved code block data.

12. The method of claim 11, wherein the interleaved code block data comprises interleaved systematic data and parity data within the code block, and wherein the systematic data is uniformly distributed throughout the interleaved code block data.

13. The method of claim 11, wherein the interleaved code block data provides time diversity for the deinterleaved code block data and the interleaved OFDM symbol data provides frequency diversity for the deinterleaved code block data.

14. The method of claim 11, wherein the decoding the deinterleaved code block data comprises decoding of turbo code encoded data, low density parity check (LDPC) encoded data, or tail-biting convolutional code (TBCC) encoded data.

15. The method of claim 11, wherein the decoding the deinterleaved code block data comprises pipelined decoding of the code block.

16. The method of claim 11, further comprising:
transmitting an indication to a transmitter of the transmitted code block that indicates capability for supporting the two stage channel interleaving.

17. The method of claim 16, further comprising:
receiving signaling indicating whether the transmitted code block contains interleaved code block data and interleaved OFDM symbol data;
performing a legacy single stage deinterleaving of parity data within the transmitted code block when the signaling does not indicate that the transmitted code block contains interleaved OFDM symbol data; and
performing the deinterleaving the interleaved OFDM symbol data, concatenating, and deinterleaving the interleaved code block data when the signaling does indicate that the transmitted code block contains interleaved OFDM symbol data.

18. An apparatus for wireless communication, in a system comprising:
a processor;
memory in electronic communication with the processor; and
instructions stored in the memory and operable, when executed by the processor, to cause the apparatus to:
identify code block data to be transmitted in a code block to a receiver;
interleave the code block data to generate interleaved code block data;
concatenate interleaved code block data from different code blocks sequentially;
allocate the concatenated interleaved code block data into orthogonal frequency division multiplexing (OFDM) symbols sequentially;
interleave the concatenated interleaved code block data allocated into each OFDM symbol to generate interleaved OFDM symbol data to be transmitted in each OFDM symbol; and
transmit the OFDM symbols to the receiver.

19. The apparatus of claim 18, wherein the instructions are further executable by the processor to:
interleave systematic data and parity data within the code block data to provide a uniform distribution of the systematic data in time within the code block.

20. The apparatus of claim 18, wherein the interleaved code block data provides time diversity for the code block data and the interleaved OFDM symbol data provides frequency diversity for the code block data.

21. The apparatus of claim 18, wherein the code block data comprises turbo code encoded data, low density parity check (LDPC) encoded data, or tail-biting convolutional code (TBCC) encoded data.

22. The apparatus of claim 18, wherein the instructions are further executable by the processor to:
allocate interleaved code block data from multiple code blocks into a plurality of other OFDM symbols;
interleave, for the plurality of other OFDM symbols, the associated portion of the interleaved code block data to generate interleaved OFDM symbol data for the plurality of other OFDM symbols; and
transmit the plurality of other OFDM symbols of the code block to the receiver.

23. The apparatus of claim 22, wherein interleaving within the code block and interleaving within the OFDM symbols allow pipelined implementation of decoding of the code blocks at the receiver.

24. The apparatus of claim 18, wherein the instructions are further executable by the processor to:
receive, from the receiver, an indication of whether the receiver is capable of supporting two stage channel interleaving; and
perform two stage interleaving to generate the interleaved code block data and the interleaved OFDM symbol data responsive to the receiver indicating that it is capable of supporting two stage interleaving.

25. The apparatus of claim 18, wherein the instructions are further executable by the processor to:
determine whether the code block data includes broadcast data to be transmitted to a plurality of receivers or unicast data to be transmitted to a single receiver;
perform two stage channel interleaving to generate the interleaved code block data and the interleaved OFDM symbol data when the code block data includes unicast data; and
bypass the interleaving to generate the interleaved code block data and the interleaved OFDM symbol data when the code block data includes broadcast data.

26. An apparatus for wireless communication, in a system comprising:
a processor;
memory in electronic communication with the processor; and
instructions stored in the memory and operable, when executed by the processor, to cause the apparatus to:
receive a plurality of OFDM symbols of a transmitted code block;
demodulate the plurality of OFDM symbols to obtain interleaved OFDM symbol data for the plurality of OFDM symbols;
deinterleave the interleaved OFDM symbol data for the plurality of OFDM symbols to obtain deinterleaved OFDM symbol data for the plurality of OFDM symbols;
concatenate the deinterleaved OFDM symbol data for the plurality of OFDM symbols of the transmitted code block to obtain interleaved code block data of the transmitted code block;
deinterleave the interleaved code block data to obtain deinterleaved code block data; and
decode the deinterleaved code block data.

27. The apparatus of claim 26, wherein the interleaved code block data comprises interleaved systematic data and parity data within the code block, and wherein the systematic data is uniformly distributed throughout the interleaved code block data.

28. The apparatus of claim 26, wherein the instructions to decoding the deinterleaved code block data comprises instructions for pipelined decoding of the code block.

29. The apparatus of claim 26, wherein the instructions are further executable by the processor to:
transmit an indication to a transmitter of the transmitted code block that indicates capability for supporting the two stage channel interleaving.

30. The apparatus of claim 29, wherein the instructions are further executable by the processor to:
receive signaling indicating whether the transmitted code block contains interleaved code block data and interleaved OFDM symbol data;
perform a legacy single stage deinterleaving of parity data within the transmitted code block when the signaling does not indicate that the transmitted code block contains interleaved OFDM symbol data; and
perform the deinterleaving the interleaved OFDM symbol data, concatenating, and deinterleaving the interleaved code block data when the signaling does indicate that the transmitted code block contains interleaved OFDM symbol data.

* * * * *